United States Patent [19]

Miller

[11] Patent Number: 5,660,488
[45] Date of Patent: Aug. 26, 1997

[54] ERGONOMICALLY CONDENSED QWERTY KEYBOARD

[76] Inventor: Timothy M. Miller, 230 Arriba Dr., #2, Sunnyvale, Calif. 94086

[21] Appl. No.: 311,842

[22] Filed: Sep. 23, 1994

Related U.S. Application Data

[63] Continuation of Ser. No. 54,766, Apr. 29, 1993, abandoned.

[51] Int. Cl.$^6$ .................................................. B41J 5/08
[52] U.S. Cl. ...................... 400/486; 361/680; 340/407.2; 364/709.12; 400/488; 400/489
[58] Field of Search ........................ 400/486, 489, 400/487, 488, 472, 473, 493, 493.1, 485; 361/680; 235/145 R, 146; 340/407.2; 364/189, 709.12

[56] References Cited

U.S. PATENT DOCUMENTS

| | | | |
|---|---|---|---|
| 1,138,474 | 5/1915 | Heidner | 400/489 |
| 1,718,694 | 6/1929 | Kurowski | 400/494 |
| 3,929,216 | 12/1975 | Einbinder | 400/489 |

(List continued on next page.)

FOREIGN PATENT DOCUMENTS

| | | | |
|---|---|---|---|
| 403523 | 4/1921 | Germany | 400/486 |
| 1271125 | 6/1968 | Germany | 400/485 |
| 2725677 | 2/1977 | Germany | 400/486 |
| 3747516 | 6/1989 | Germany | 400/489 |
| 465533 | 9/1951 | Italy | 400/486 |
| 62-22129 | 1/1987 | Japan | 400/489 |
| 1680579 | 9/1991 | Russian Federation | 400/487 |
| 90959 | 12/1937 | Sweden | 400/488 |
| 0651504 | 9/1985 | Switzerland | 400/485 |
| 504867 | 5/1939 | United Kingdom | 400/489 |
| 9214612 | 9/1992 | WIPO | 400/489 |
| 9307738 | 4/1993 | WIPO | 400/489 |

OTHER PUBLICATIONS

"Apple Goes Ergonomic," MacUser, Mar. 1993, p. 44.
T. Schmitz, "Striking A Chord," San Jose Mercury News, Feb. 23, 1992, pp. 1F and 5F.
C. Barr, "The First Subnotebooks," PC Magazine, Oct. 27, 1992, pp. 128–129.
C. Barr, "Squeeze Play," PC Magazine, Oct. 27, 1992, pp. 116 and 120.
K. Sullivan, "Keyboard designers give users a hand," San Francisco Examiner, May 26, 1991, pp. D–1 and D–6.
J. Skillings, "Smaller–than–ever notebooks just around the bend," PC Week, Dec. 17, 1990, vol. 7, No. 50, pp. 1–2.
"Marquardt–Miniergo 1:1" Brochure 4 Pages Sep. 1992 printed in Germany.

*Primary Examiner*—Eugene H. Eickholt
*Attorney, Agent, or Firm*—Skjerven, Morrill, MacPherson, Franklin & Friel; Forrest E. Gunnison

[57] ABSTRACT

An ergonomically improved, reduced size keyboard having a QWERTY keyboard layout allows maintenance of the same typing speed and accuracy associated with conventional keyboards. In one embodiment, the keys of the keyboard are divided into two sections, the sections being arranged to form a V-shape such that the centermost key in each row of each section approximately contacts the centermost key of the corresponding row in the other section. The V-shaped key layout allows the keyboard to maintain nearly all of the interkey spacing of a full-size keyboard while reducing overall keyboard width. The V-shaped key layout also alleviates wrist and finger strain that may otherwise occur during prolonged use of a keyboard. In another embodiment, further ergonomic improvement and size reduction of the keyboard is obtained by arcing each row of keys. Keys not on the row of home row keys are placed in the same positions relative to home row keys as found on a standard QWERTY keyboard. As a result, typists may switch easily between standard QWERTY keyboards and the keyboard according to the invention. A keyboard with a V-shaped keyboard layout and arced key rows according to the invention has a width 22.7% smaller than a typical full-size keyboard, while maintaining 95% of the interkey spacing. This keyboard according to the invention also has approximately the same width as a comparable reduced size keyboard, while increasing interkey spacing 18.75%.

42 Claims, 20 Drawing Sheets

U.S. PATENT DOCUMENTS

| | | | |
|---|---|---|---|
| 4,655,621 | 4/1987 | Holden | 400/489 |
| 4,824,268 | 4/1989 | Diernisse | 400/489 |
| 5,067,834 | 11/1991 | Szmanda et al | 400/472 |
| 5,073,050 | 12/1991 | Andrews | 400/489 |
| 5,119,078 | 6/1992 | Grant | 400/486 |
| 5,122,786 | 6/1992 | Rader | 400/489 |
| 5,129,747 | 7/1992 | Hutchison | 400/489 |
| 5,156,475 | 10/1992 | Zilberman | 400/489 |
| 5,336,001 | 8/1994 | Lichtenberg | 400/472 |
| 5,360,280 | 11/1994 | Camacho et al. | 400/488 |
| 5,397,189 | 3/1995 | Minogue | 400/489 |
| 5,424,728 | 6/1995 | Goldstein | 400/439 |

ERGONOMICALLY CONDENSED QWERTY KEYBOARD

This application is a continuation of application Ser. No. 08/054,766, filed Mar. 29, 1993 now abandoned.

BACKGROUND OF THE INVENTION

1. Field of the invention

This invention relates generally to keyboards for use with computers or typewriters and, in particular, to the key layout of a QWERTY keyboard.

2. Related Art

As a primary interface between user and machine, keyboards are an important component in the successful operation of computers and typewriters. The comfort, speed and accuracy with which data can be input using a particular keyboard are important criteria for evaluation of that keyboard's effectiveness. The size of the keyboard is also of great importance since many portable computers require keyboards of reduced size as compared to desktop computers.

The advent of notebook (measuring, in the closed position, approximately 8.5 inches by 11 inches) and subnotebook (measuring in the closed position, approximately 5 to 7 inches by 8.5 to 10 inches) computers has created a need to minimize the size of keyboards. Keyboard size is the primary stumbling block on the path to increasingly smaller portable computers. Smaller keyboards that do not sacrifice the comfort and speed capacity associated with conventionally sized keyboards are needed for these computers.

Additionally, keyboard makers have known for some time that keyboards can cause injury if used for protracted periods of time. In particular, carpal tunnel syndrome, a condition in which the tendons in the hand swell from overuse and misuse, has received much public attention in recent years. The incidence of this condition has increased as the use of computers becomes an integral part of the daily activities of more and more workers. The increase in keyboard related injuries has provided motivation to develop ergonomically improved keyboards.

The standard keyboard key layout is referred to as "QWERTY" (so named because of the order of the alphabetical keys in the upper left corner of the key layout). FIG. 1A shows a QWERTY keyboard layout 110 with four rows of primarily alphanumeric keys. FIG. 1B shows the home row keys 100 of QWERTY keyboard layout 110. The home row keys 100 include two sets of keys 101a, 101b (the primary home row keys) above which a typist's fingers are typically oriented (i.e., a first set 101a consisting of the 'A', 'S', 'D', 'F' keys and a second set 101b consisting of the 'J', 'K', 'L' ';' keys). The remaining home row keys are 'G', 'H' and '''.

FIG. 1C shows a keyboard 140 with an extended keyboard layout 120 including the QWERTY keyboard layout 110 and a variety of specialized function keys, e.g., F4 key 121. Note that the keys of the extended keyboard layout 120 are arranged in horizontal rows across the length of the keyboard 140.

In the key layouts shown in FIGS. 1A, 1B and 1C, each key is shown as contacting adjacent keys along the key's full length. In practice, there is typically some spacing between keys; however, for purposes of illustration, such an idealized representation accurately depicts the relationship between keys.

Referring to FIG. 1B, the interkey spacing 150 is measured as the distance between center points 102a, 102b of adjacent keys in the same row. The width 151 of each key (equal to the interkey spacing 150 in this idealized representation) and height 152 are also shown in FIG. 1B.

A typical interkey spacing 150 for the keys in the QWERTY keyboard layout 110 of a full-size keyboard is 0.75 inches (1.91 cm), which is reported to be the minimum size that allows comfortable, fast, and accurate typing to be maintained. For an interkey spacing 150 of 0.75 inches (1.91 cm), a total interkey spacing 160 of the home row keys 100 of the QWERTY keyboard layout 110 is 7.5 inches (19.1 cm) and total width 161 of home row keys 100 is 8.25 inches (21.1 cm).

A full-size keyboard with an extended keyboard layout 120 (FIG. 1C), in which the keys in the QWERTY keyboard layout 110 have an interkey spacing 150 of 0.75 inches (1.91 cm), typically has a width 155 of 11–11.5 inches (27.9–29.2 cm) and a height 156 of 5–5.5 inches (12.7–14.0 cm). Height 156 and width 155 are undesirably large for the current generation of subnotebook computers.

One approach used to make smaller keyboards is simply to reduce all dimensions of the keys by a given amount. For example, a reduced size keyboard made by Poqet Computer, now Fujitsu Personal Systems, has an interkey spacing 150 (FIG. 1B) of 0.6 inches (1.52 cm). This reduces the total interkey spacing 160 of the home row keys 100 to 6.0 inches (15.2 cm). As a result, width 155 (FIG. 1C) is reduced to approximately 8.31 inches (21.1 cm) and height 156 is reduced to 4 inches (10.2 cm). While this approach does indeed produce a smaller keyboard 140, the reduced interkey spacing 150 makes it difficult to type quickly, accurately and comfortably.

In another keyboard having reduced key dimensions, the Gateway 2000 Handbook, the interkey spacing 150 is 0.70 inches (1.78 cm). Thus, the total interkey spacing 160 of the home row keys 100 is 7.0 inches (17.8 cm) and the width 155 is reduced (as compared to a full-sized keyboard) to 9.75 inches (24.8 cm).

In addition to the problem of size, the ergonomic properties of keyboard 140 are unsatisfactory. As shown in FIG. 2, when typing, forearms 201 are angled in a V-shape. Hands 203 are forced to assume an approximately parallel position with respect to each other, resulting in a slight bending of wrists 202 that, when maintained for prolonged periods, can cause discomfort. Wrists 202 would be more comfortable if hands 203 were allowed to simply continue in line with forearms 201.

In keyboard 140, the keys are arranged in straight rows. Due to the differing lengths of fingers 204, tips 205 of fingers 204 form an arc when allowed to rest naturally while hands 203 are held in typing position. To conform to the straight rows of keys of keyboard 140, fingers 204 are held in an unnatural position while they are poised to type over home row keys 100. This unnatural position causes hand discomfort and makes touch typing more difficult due to the tendency of the fingers to stray from home row keys 100 into a more natural position.

A number of approaches have been taken to improve the ergonomic characteristics of keyboard 140. In one approach, the keyboard surface underneath the wrists curls up to form a built-in wrist rest. While this approach provides support for the wrists, it does nothing to attack the ergonomic deficiencies noted above that are a consequence of QWERTY keyboard layout 110.

In another approach, the keys of QWERTY keyboard layout 110 are separated into right and left concave pads with some of the function keys, e.g., F4 key 121 moved to the center of the keyboard between the two pads. The keys in each of the right and left pads are arranged in a grid of columns and rows. While this approach does help alleviate some of the ergonomic problems noted above, it does so at the cost of increasing the size of the keyboard. Such a solution is unacceptable for notebook and subnotebook computers. Further, the arrangement of the keys of each pad in columns means that the relative finger positioning of the standard QWERTY keyboard layout 110 is not maintained, thus making use of the keyboard awkward for typists who are acclimated to the QWERTY keyboard layout 110.

In yet another approach, shown in FIG. 3, a QWERTY keyboard layout 310 is separated into right and left pads 300a, 300b. Pads 300a, 300b are placed at an angle to each other, forming a V-shape, so that the top centermost keys 305, 306 and only the top centermost keys 305, 306 of each pad 300a, 300b touch each other at respective upper corners 305a, 306a. A progressively widening space 307 separates the centermost keys of the other rows of keys. The keys are arranged in columns so that the relative positions of keys in the QWERTY keyboard layout are changed from the standard positioning shown in FIG. 1A. While this approach helps alleviate the problem of wrist strain, it achieves its benefits at the cost of an increase in size. Further, since the relative positions of keys are not the same as those of the standard QWERTY keyboard layout 110, use of the keyboard is awkward for QWERTY typists. Additionally, the outermost keys in the upper two rows (i.e., the "", "1", "]" and "\" keys) require a longer reach by the little finger of the hand, making use of the QWERTY keyboard layout 310 difficult and uncomfortable.

Finally, an approach has been tried in which the keyboard is divided into two separate halves that are positioned at an angle with respect to each other in two separate planes. A V-shaped, A-frame structure results. Again, this approach alleviates wrist strain, but does not address the finger positioning problems. Further, the benefits are achieved with a significant increase in complexity of the mechanical structure, making the structure expensive and difficult to produce, and increasing the likelihood of repair of malfunctioning parts.

The sizing and ergonomic deficiencies of conventional keyboards (e.g., keyboard 140) have created a need for a reduced size, ergonomically improved keyboard that includes the standard QWERTY keyboard layout such that individual finger motions remain the same as in the standard QWERTY keyboard layout so that QWERTY keyboard typists can make an easy transition back and forth between the reduced size keyboard and a standard full-size keyboard. This need has not been met in a satisfactory way by the approaches taken so far.

SUMMARY OF THE INVENTION

An ergonomically improved, reduced size keyboard with a QWERTY keyboard layout is provided. In one embodiment according to the invention, the rows of keys in the QWERTY keyboard layout are divided into two sections and angled, in the plane of the keyboard, to form a V-shape such that a key in the home row of the first group of rows contacts a key in the home row of the second group of rows. The keyboard so formed has a reduced width, as compared to conventional keyboards with a QWERTY keyboard layout, yet the same interkey spacing is maintained between keys of the QWERTY keyboard layout as in a full-size keyboard. Since the full-size keyboard interkey spacing is maintained, comfort, speed and accuracy are not compromised by the reduction in size of the keyboard.

In the QWERTY keyboard layout of the keyboard according to the invention, the order of rows and the order of keys within rows remains the same as in a standard QWERTY keyboard layout. Thus, in making the transition from using existing standard keyboards to using the ergonomically improved, reduced size keyboard according to the invention, there is no need to learn a new keyboard layout.

The V-shape of the keyboard according to the invention produces beneficial ergonomic effects. When poised above the keyboard in typing position, the hands are allowed to follow the line of the forearms so that the wrists are not bent at an uncomfortable angle.

In another embodiment according to the invention, the rows of keys in the QWERTY keyboard layout are divided into two groups, and the primary home row keys in each of the groups define an arc such that a V-shape is formed by a chord of each arc. The arc of the primary home row keys conforms generally to the natural position of the finger tips when the hands are held poised to type. The other rows of keys are positioned in arcs so that the relative position of those keys with respect to the home row keys is approximately the same as in a conventional keyboard having a standard QWERTY keyboard layout. Consequently, relative finger motions remain the same as the relative finger motions required for the standard QWERTY keyboard layout. Thus, easy transition between standard QWERTY keyboards and a keyboard according to this embodiment of the invention is possible.

The arc of the primary home row keys of each group can be, for instance, circular, elliptical or parabolic. If the arc of the primary home row keys is circular, the arc may range from a straight line to a semicircle. Generally, the arcs of the primary home row keys in each group are the same.

In any embodiment of the invention in which the rows of keys of the QWERTY keyboard layout are formed in arcs, the keyboard according to the invention has ergonomic benefits in addition to those described above, since the arcs allow more natural positioning of the fingers during typing so as to reduce stress on the fingers.

In any of the embodiments of the keyboard according to the invention, keys actuated by the small finger of the hand may be made so as to reduce the interkey spacing between such keys and adjacent keys. Because the small finger of the hand requires less space when typing than the other larger fingers, this reduction in interkey spacing allows the keyboard according to the invention to be further reduced in size without producing a detrimental effect on typing capabilities.

A keyboard with a V-shaped QWERTY keyboard layout having arced key rows according to one embodiment of the invention has a width 22.7% smaller than a typical full-size keyboard (i.e., the width is reduced from 11 inches to 8.5 inches). Total interkey spacing along the home row of this keyboard is reduced by only 5% as compared to a typical full-size keyboard. The keyboard according to this embodiment of the invention also has a width approximately equal to a comparable reduced size keyboard, such as the Poqet keyboard, but a total interkey spacing along the home row that is 18.75% greater than that reduced size keyboard.

In the keyboard according to the invention, the finger contacting surfaces of the keys may be rectangular, circular or any other shape. The function keys in an extended keyboard layout according to the invention may be arranged in any manner. The keyboard according to the invention may include a means for highlighting the finger contacting surfaces of all of the primary home row keys or, alternatively, only pairs of keys, e.g., the 'F' and 'J' keys or the 'D' and 'K' keys. Such highlighting may be done by forming a contrasting design or a protrusion on the finger contacting surface of the highlighted keys. The keyboard according to the invention may also include a numeric keypad embedded in the keyboard by overlaying it on selected keyboard keys. The keyboard according to the invention may also include a space bar formed on the main keyboard surface below the bottom row of QWERTY keys, on a surface perpendicular to the main keyboard surface adjacent the bottom row of QWERTY keys, or on both surfaces.

DETAILED DESCRIPTION

According to the invention, an improved keyboard with a QWERTY keyboard layout suitable for use with all computers ranging from work stations to pocket computers is provided. The improved keyboard includes rows of keys arranged in a QWERTY keyboard layout. The rows of keys are divided into two sections. The two sections are angled, in the plane of the keyboard, with respect to each other to form a V-shape.

As compared to conventional full-sized keyboards, the improved keyboard has a reduced width while maintaining approximately the same interkey spacing as that of the full-sized keyboard. The V-shape of the rows of keys also improves the ergonomic characteristics of the improved keyboard. Further, the order of rows and the order of keys within rows remains the same as in a standard QWERTY keyboard layout so that the improved keyboard can be used without having to learn a new keyboard layout. The above characteristics of the improved keyboard enable comfort, speed, and accuracy to be maintained during typing while a reduction in size of the keyboard is achieved.

Figure 4:
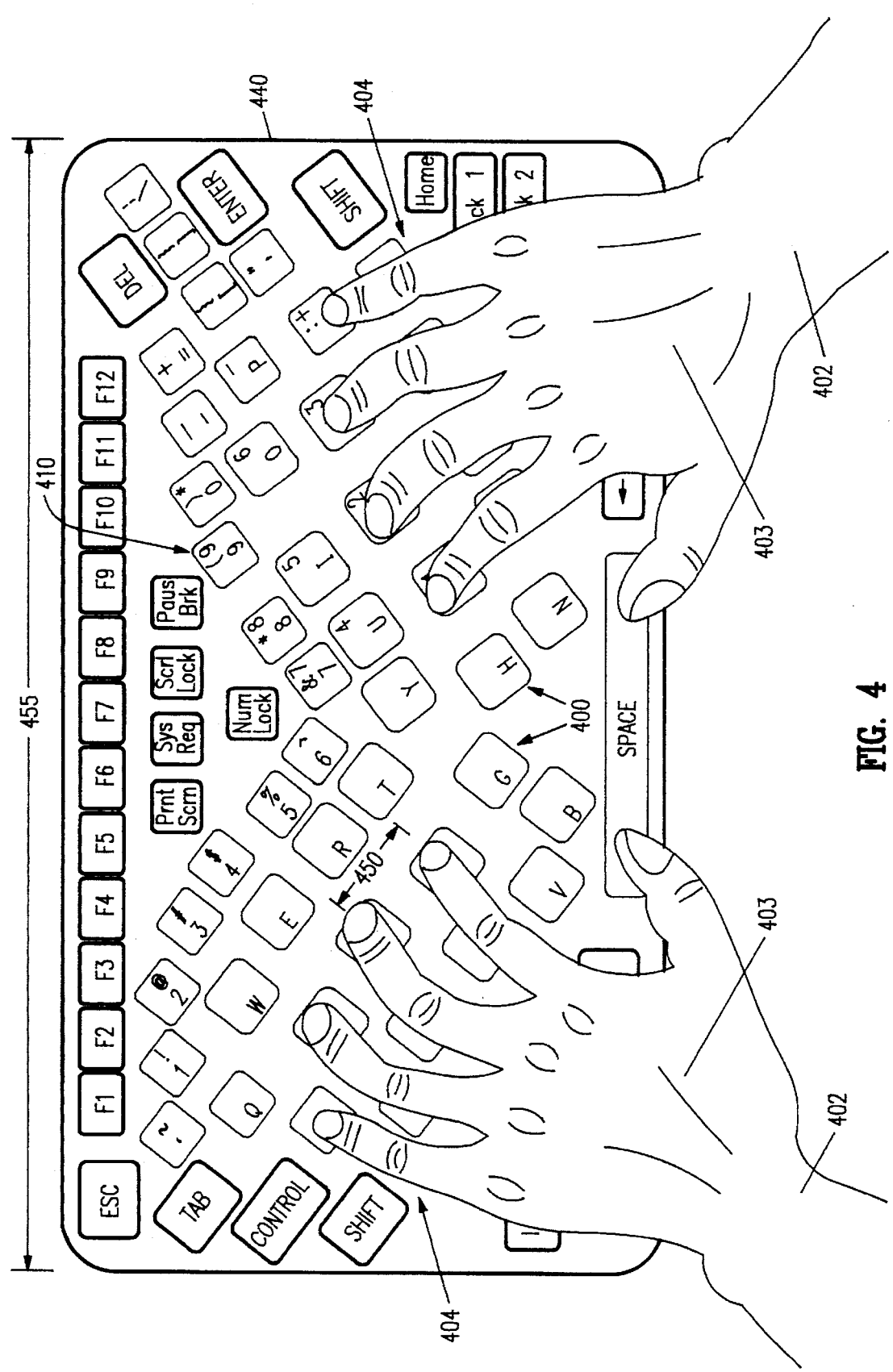
FIG. 4 shows a keyboard according to the invention with hands and forearms placed over the keyboard poised to type.

In keyboard 440 (FIG. 4) of this invention, the order of rows and the order of keys within rows of the QWERTY keyboard layout 410 remain the same as in standard keyboard 140. However, unlike the QWERTY keyboard layout of standard keyboard 140, each of the rows of keyboard 440 are formed in a V-shape, as described in more detail below. Thus, since the QWERTY keyboard layout forms the most used portion of a keyboard layout, in making a transition from using standard keyboard 140 to using keyboard 440 acclimation to a fundamentally different keyboard layout is unnecessary.

Further, interkey spacing 450, i.e., the distance between the center points of adjacent keys in the same row, of the QWERTY keyboard layout 410 of keyboard 440 is maintained approximately the same as in standard keyboard 140. This aspect of the invention is especially important for keyboards that are used with small computers that require a keyboard smaller than full-size. Maintaining full-size interkey spacing on reduced size keyboards prevents the fingers from being cramped during typing. Thus, the ease and comfort associated with typing on a full-size keyboard is maintained when typing on a reduced size keyboard of this invention.

QWERTY keyboard layout 410 of keyboard 440 incorporates V-shaped rows of keys. The V-shaped rows of keys allow width 455 of keyboard 440 to be reduced compared to width 155 of standard keyboard 140.

The V-shaped rows of keys also provide improved ergonomic characteristics relative to the standard keyboard 140. Hands 403 are held in a position that avoids unnatural bending of wrists 402 when hands 403 are held over home row keys 400 of keyboard 440 in the typing position.

Additionally, in keyboard 440, each row of keys in the QWERTY keyboard layout 410 is preferably divided into two sections and each section is arranged in an arc that conforms to the natural position of fingers 404 when hands 403 are held poised to type. Since the arced rows are aligned with the natural position for the fingers, the arced rows avoid the awkward positioning of fingers 404 that is necessitated by the straight rows of QWERTY keyboard layout 110 of standard keyboard 140.

Figure 5A:
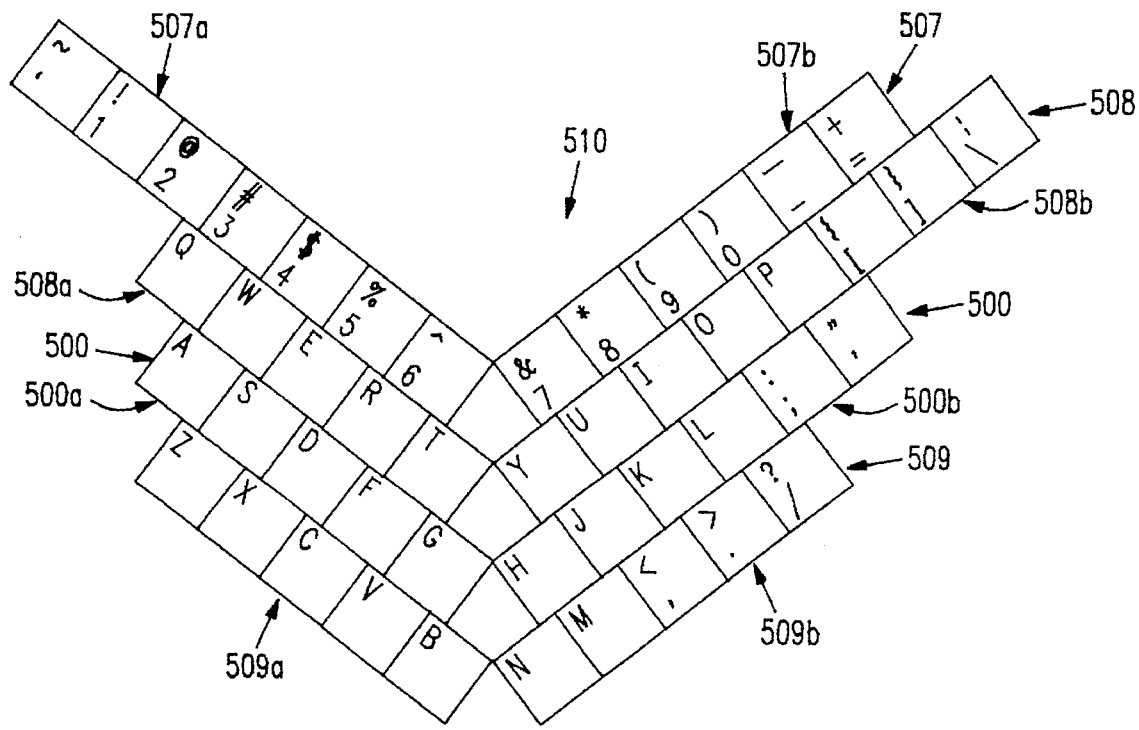
FIG. 5A shows a QWERTY keyboard layout formed in a V-shape according to an embodiment of the invention.

FIG. 5A shows a QWERTY keyboard layout 510 formed in a V-shape according to one embodiment of the invention. QWERTY keyboard layout 510 includes rows of keys 507, 508 and 509, and home row keys 500.

Figure 5B:
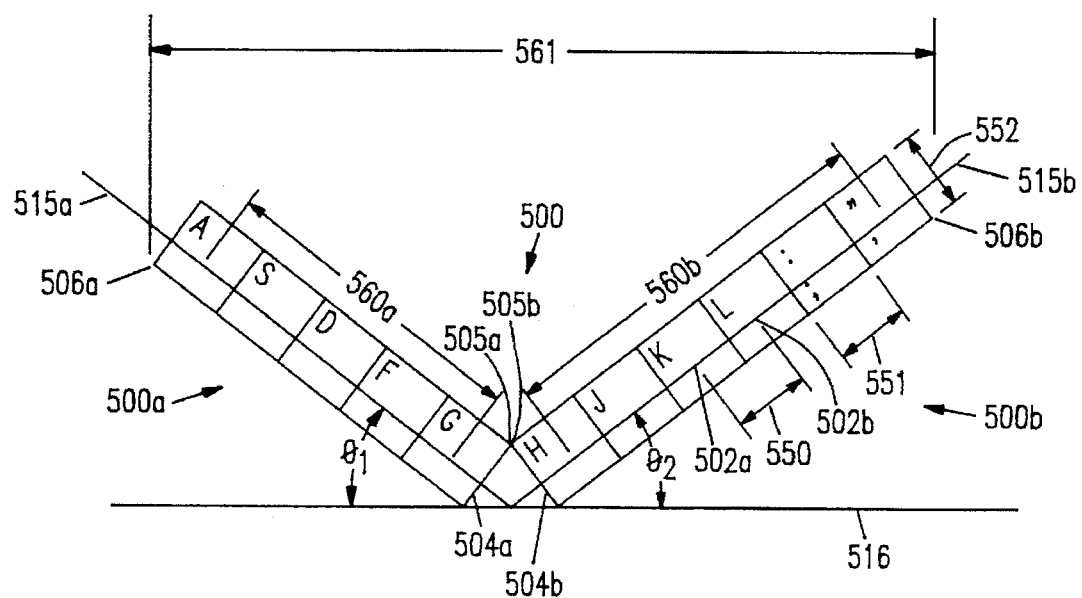
FIG. 5B shows the home row keys for the QWERTY keyboard layout of FIG. 5A.
Figure 5C:
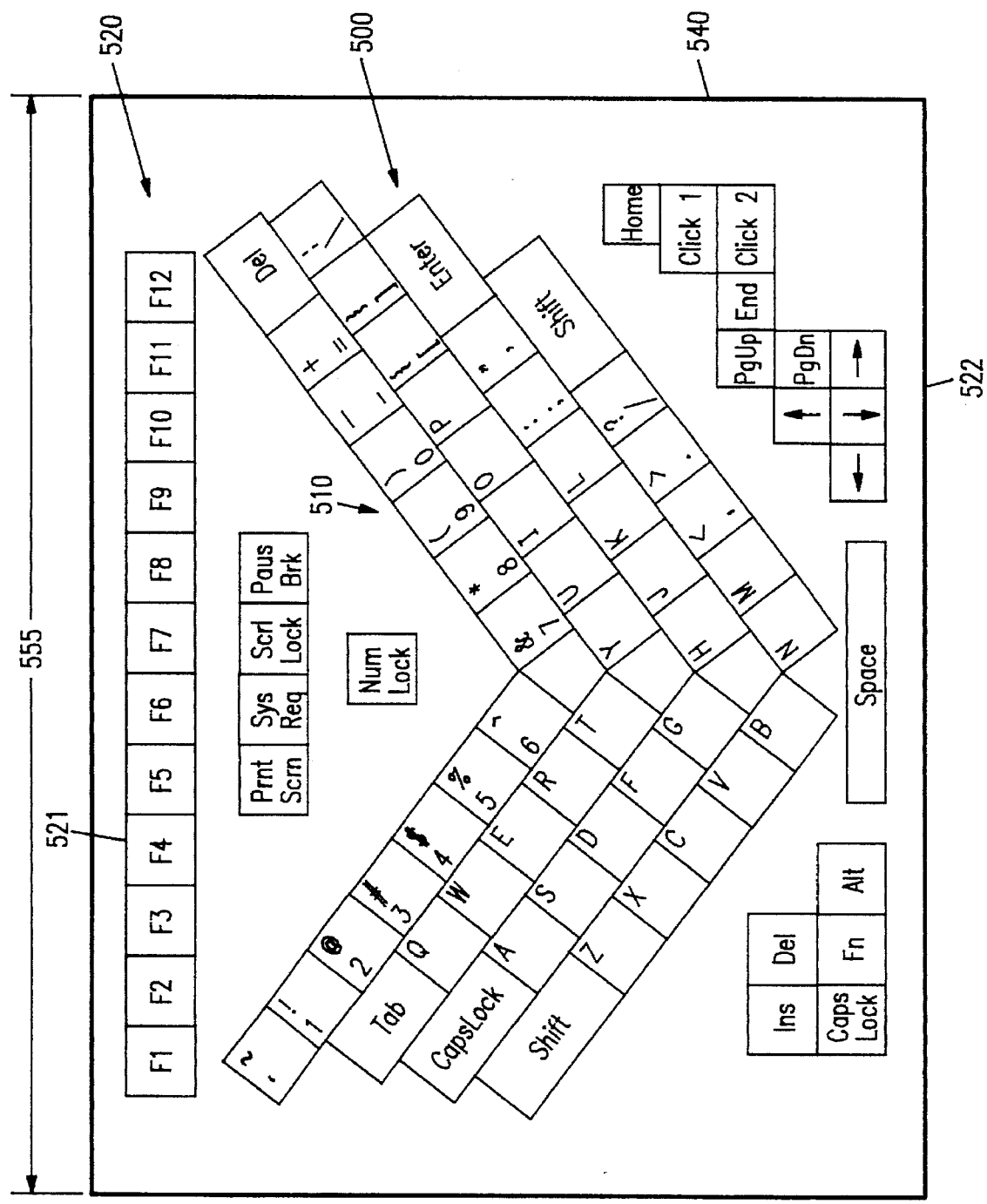
FIG. 5C shows a keyboard with an extended keyboard layout including the QWERTY keyboard layout of FIG. 5A and a variety of specialized function keys.

FIG. 5B shows home row keys 500 of QWERTY keyboard layout 510. Home row keys 500 have been divided into two sections 500a, 500b, where section 500a includes keys 'A', 'S', 'D', 'F', 'G' and section 500b includes keys 'H', 'J', 'K', 'L', ';', ''''. Sections 500a, 500b are aligned along lines 515a and 515b, respectively, to form a V-shape. Line 515a forms an angle $\Theta_1$ with a line 516, that is substantially parallel to edge 522 of keyboard 540 (FIG. 5C). Line 515b forms an angle $\Theta_2$ with line 516. Preferably, angle $\Theta_1$ is equal to angle $\Theta_2$. The centermost keys 504a and 504b in each section 500a and 500b, respectively, contact each other at upper corners 505a and 505b, respectively.

The rows of keys 507, 508, 509 are also each divided into two sections 507a and 507b, 508a and 508b, and 509a and 509b, respectively, and formed in a V-shape. As with home row keys 500, the centermost keys of each section, e.g., sections 507a, 507b, in each row of keys, e.g., row of keys 507, contact each other at an upper corner.

In the key layouts shown in FIGS. 5A, 5B and 5C, an idealized representation of each key (with the exception of the centermost keys, e.g., keys 504a, 504b, in each section 500a, 500b of each row 500) is shown as contacting adjacent idealized representations of keys along the key's full length. Though, in practice, there is typically some spacing between keys, for purposes of illustration such an idealized representation accurately depicts the relationship between keys. Herein, two keys are said to "approximately contact" each other when idealized representations of the two keys can be drawn (the idealized representations being drawn in a manner consistent with the idealized representations of other keyboard keys, none of the idealized representations of keyboard keys overlapping) such that the contours of the idealized representations of the two keys contact but do not overlap each other.

As illustrated in FIG. 5B, interkey spacing 550 (distance between the center points, e.g., center point 502a, 502b of adjacent keys in the same row) is "i", width 551 of each key (equal to the interkey spacing) is "w" and height 552 of each key is "h". In practice, width 551 of a key is somewhat less than "w" and height 552 is somewhat less than "h". Further, the finger contacting surfaces of the keys may have a width and height that is different than the width and height of the keys at their base (i.e., portion of the keys that extends into the interior of the keyboard).

As previously noted, a typical interkey spacing 150 for QWERTY keyboard layout 110 of a full-size keyboard is 0.75 inches (1.91 cm). Total interkey spacing 160 along home row keys 100 of QWERTY keyboard layout 110 was 7.5 inches (19.1 cm) and total width 161 of home row keys 100 was 8.25 inches (21.0 cm). For an interkey spacing 550 of 0.75 inches (1.91 cm), home row keys 500 of QWERTY keyboard layout 510 according to this embodiment of the invention also have a total interkey spacing of 7.5 inches (19.1 cm). (For purposes of calculation of the total interkey spacing of the home row keys 500, interkey spacing 550 between the 'G' 504a and 'H' 504b keys is set equal to interkey spacing 550 between other home row keys 500, though, in fact, it is somewhat larger when measured between the centers of keys 'G' 504a and 'H' 504b in a direction parallel to line 516. Interkey spacing 550 between keys 'G' 504a and 'H' 504b is set equal to 0.75 inches (1.91 cm) in recognition of the fact that no substantial benefit is conferred by making an interkey spacing 550 larger than that found in a full-size keyboard.) The total interkey spacing of home row keys 500 is equal to the sum of the two sectional interkey spacings 560a and 560b plus the interkey spacing between key 'G' 504a and key 'H' 504b.

Though the total interkey spacing of home row keys 500 is the same as that of home row keys 100, the V-shape of home row keys 500 allows home row keys 500 to have a smaller effective total width 561 than total width 161 of the home row keys 100. Effective total width 561 of home row keys 500 is measured from the outermost tip (lower outside corner) 506a of key 'A' key to the outermost tip (lower outside corner) 506b of key ''''. Effective total width 561 "$W_{total}$" is given by:

$$W_{total}=(5*w*cos\Theta_1)+(6*w* cos\Theta_2)+(h*sin\Theta_1)+(h*sin\Theta_2) \qquad (1)$$

where w=a key width as defined above;

i=the interkey spacing as defined above;

$\Theta_1$=first angle defined in FIG. 5B;

h=the key height as defined above; and $\Theta_2$=second angle defined in FIG. 5B.

For $\Theta_1=\Theta_2=\Theta$ and w=h=i=0.75:

$$W_{total}=(8.25*cos\Theta)+(1.5*sin\Theta) \qquad (2)$$

Table 1 shows the values of effective total width $W_{total}$ for a representative set of angles $\Theta$.

TABLE I

| $\Theta$ | $W_{total}$ (inches) |
|---|---|
| 0 | 8.2500 |
| 5 | 8.3493 |
| 10 | 8.3851 |
| 15 | 8.3571 |
| 20 | 8.2655 |
| 20.5 | 8.2529 |
| 20.6 | 8.2503 |
| 20.7 | 8.2476 |
| 25 | 8.1110 |
| 30 | 7.8947 |
| 37.5 | 7.4583 |

Figure 6:
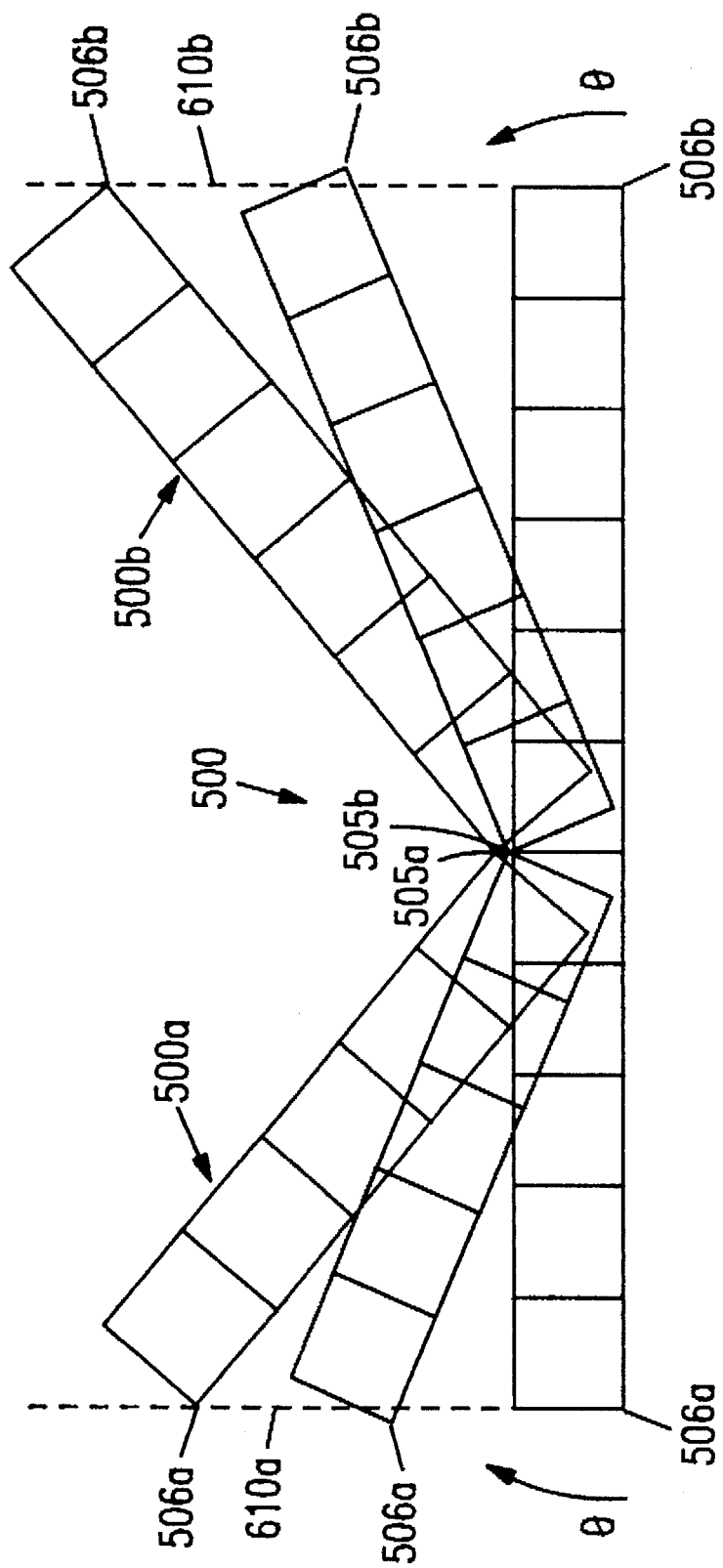
FIG. 6 shows the home row keys of FIG. 5B with the two sections of keys formed at various angles with respect to each other.

For an angle $\Theta$ equal to 0° (.i.e., the standard QWERTY keyboard layout 110), total width 161 of home row keys 100 8.25 inches (21.0 cm). As shown in FIG. 6 and Table 1, initially, as angle $\Theta$ increases, effective total width 561 increases also. This is because, as the two sections 500a, 500b are pivoted about the upper inside corners 505a, 505b of centermost keys 'G' 504a and 'H' 504b, lower outside corners 506a, 506b of outermost keys 'A' and '''' swing out beyond lines 610a and 610b that define effective total width 561 of home row keys 500 for angle $\Theta$ of zero degrees. At some point, when angle $\Theta$ is sufficiently large, lower outside corners 506a and 506b swing back inside lines 610a and 610b, respectively, resulting in a decrease of effective total width 561 of home row keys 500.

From Table 1, for an angle e approximately equal to 20.6°, effective total width 561 is equal to total width 161 of home row keys 100 of the standard QWERTY keyboard layout 110. Thus, for values of angle $\Theta$ greater than about 20.6°, effective total width 561 of home row keys 500, according to this embodiment of the invention, is less than total width 161 of the home row keys 100 of standard QWERTY keyboard layout 110. This embodiment of the invention encompasses any angular orientations of home row sections 500a and 500b that achieve a reduction in effective total width 561 of home row keys 500 as compared to home row keys 100 (i.e., angle e greater than or equal to 20.6°); however, preferably home row sections 500a and 500b are oriented so that angle Θ is approximately equal to 37.5°.

Very large values of angle e, i.e., near 90°, cause awkward positioning of the hands. Too, for values of angle Θ near 90°, interference between keys on different rows of QWERTY keyboard layout 510 occurs. For these reasons, a practical upper limit exists on the value of angle Θ. Preferably, angle Θ has a value less than 75°.

Home row keys 500 have the same total interkey spacing as home row keys 100. However, in the preferred embodiment having angle Θ approximately equal to 37.5°, effective total width 561 is only 7.46 inches (18.9 cm), a reduction of 9.6% from total width 161 of 8.25 inches (21.0 cm) of home row keys 100.

Extending the approach described above with respect to home row keys 500 to the other rows of QWERTY keyboard layout 510, width 555 of keyboard 540 is reduced by dividing each row of keys into two sections and forming those sections into a V-shape. FIG. 5B shows the QWERTY keyboard layout 510 formed according to the principles discussed with respect to home row keys 500.

FIG. 5C shows an extended keyboard 520, according to this embodiment of the invention, including QWERTY keyboard layout 510 of FIG. 5B with additional function keys, e.g., keys 521, added. The function key arrangement shown in FIG. 5C is merely exemplary and is not intended to limit the invention to the particular configuration illustrated. The particular function key arrangement is not critical to the invention, and arrangements other than the one shown are within the ambit of the invention.

Two section V-shape QWERTY keyboard layout 510, according to the principles of this invention, accomplishes size reduction while simultaneously maintaining the same interkey spacing as standard QWERTY keyboard layout 110. Consequently, a smaller keyboard 520 can be made without compromising typing comfort, speed or accuracy.

V-shape QWERTY keyboard layout 510 also provides ergonomic benefits. When typing, the forearms angle in toward the keyboard in a V-shape. The wrists are most comfortable when the hands follow the line of the forearms. Forming a V-shape with two sections of the QWERTY keyboard layout allows the wrists to assume this comfortable position when the hands are held over the keyboard while typing.

Figure 7A:
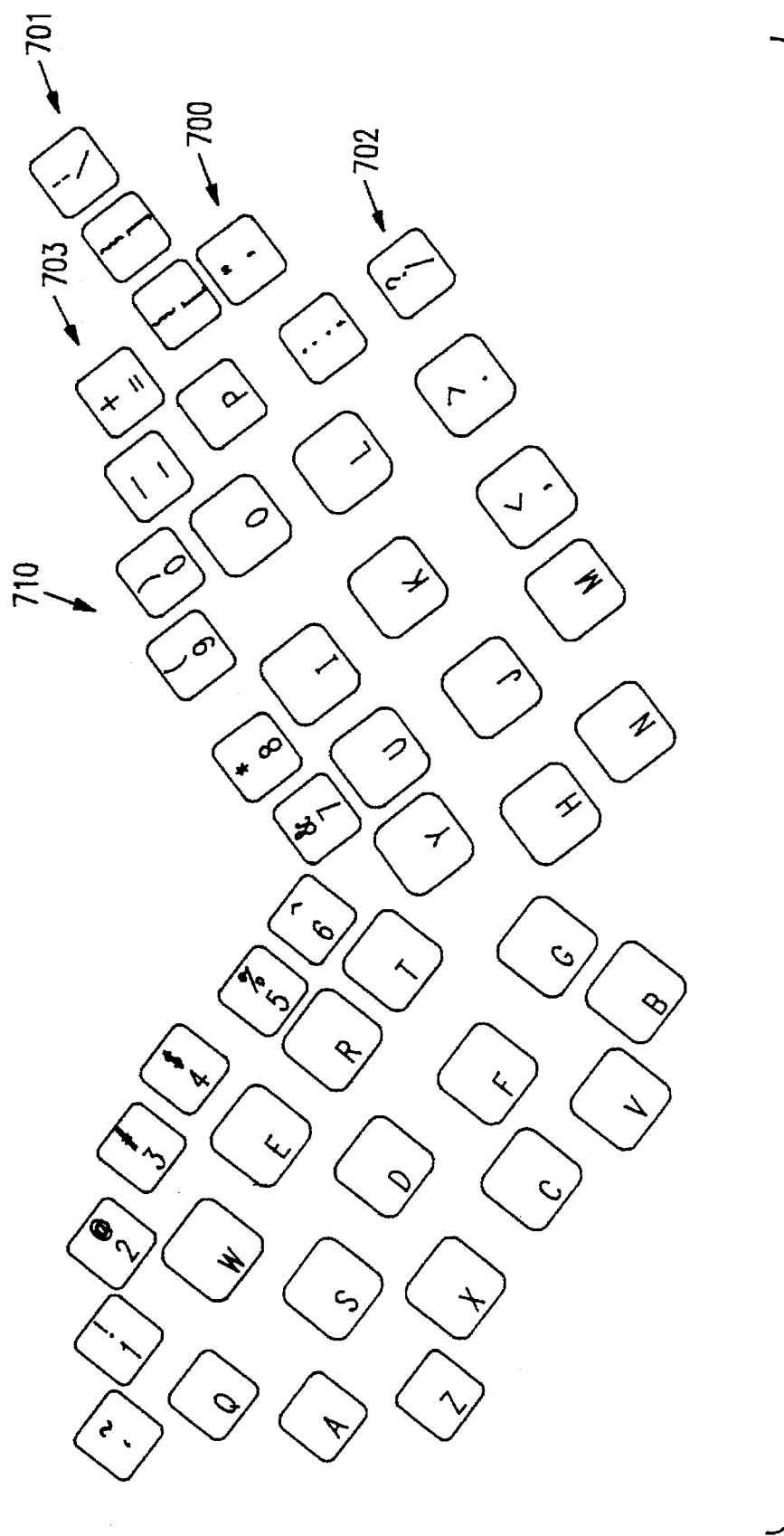
FIG. 7A shows a QWERTY keyboard layout formed in an arced V-shape according to an embodiment of the invention.
Figure 7B:
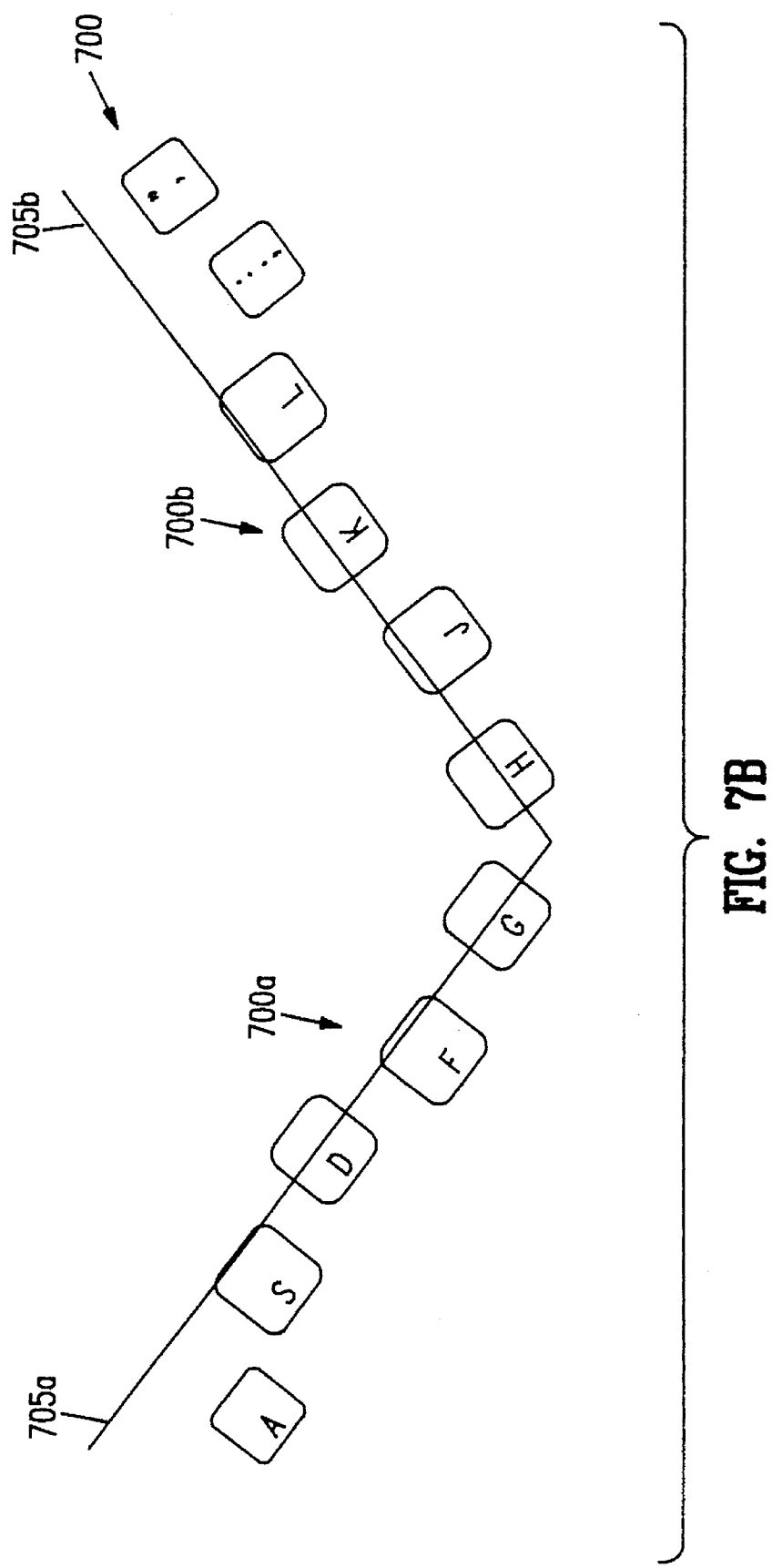
FIG. 7B shows the home row keys for the QWERTY keyboard layout of FIG. 7A.

The fingertips, when allowed to rest naturally, form an arc rather than a straight line when they are poised above the keyboard, or on a flat surface. For greatest ease in typing and comfort, it is desirable, then, to place the keys so that they describe an arc that approximates this natural positioning of the fingertips as they rest in the typing position on a hard surface. FIG. 7A shows a QWERTY keyboard layout 710 formed in an arced V-shape according to another embodiment of this invention. FIG. 7B shows home row keys 700 for QWERTY keyboard layout 710. Home row keys 700 are divided into two sections 700a and 700b and formed into a V-shape in a manner similar to that described with respect to FIGS. 5A and 6. However, in contrast to FIGS. 5A and 6, the keys in each row in each of sections 700a and 700b are arranged in an arc about lines 705a and 705b that define the V-shape. Preferably, the arcs of each section 700a and 700b of home row keys 700 are the same size and shape.

In a further embodiment according to this invention, the arcs of each section 700a, 700b are approximately circular. In this embodiment, the arcs of each section 700a, 700b are defined by curves that intersect the center points of selected home row keys 700 in that section. The selected home row keys, i.e., the "arc-defining home row keys," for each section 700a, 700b, can include some or all of the keys of the respective section 700a, 700b. In the embodiment shown in FIGS. 7A, 7B and 7C, the arc-defining home row keys include the 'A', 'S', 'D' and 'F' keys for section 700a, and the 'J', 'K', 'L' and ';' keys for the section 700b. The 'G' and 'H' keys are located so as to preserve the same individual finger motions as on a standard QWERTY keyboard.

Figure 7C:
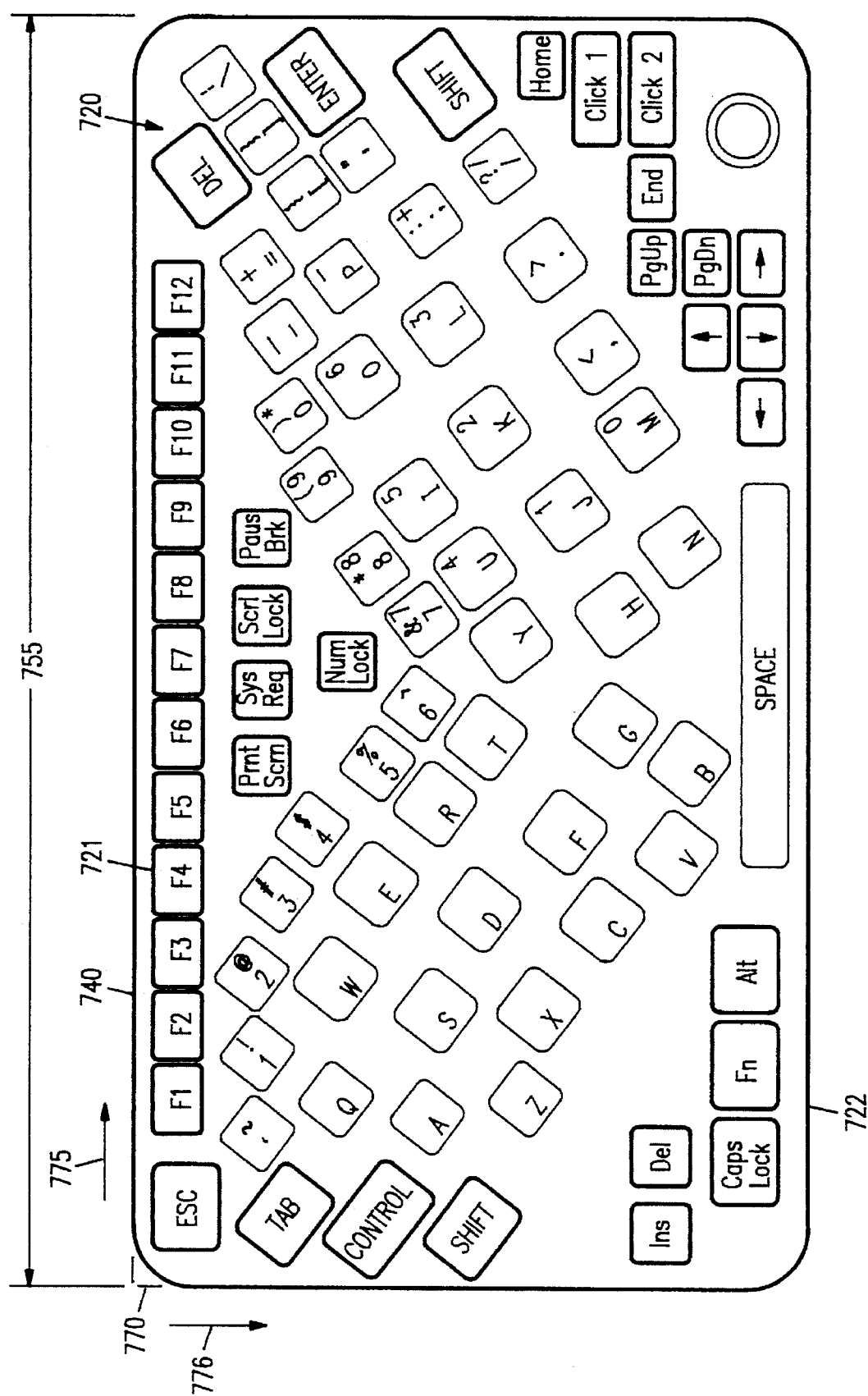
FIG. 7C shows a keyboard with an extended keyboard layout including the QWERTY keyboard layout of FIG. 7A and a variety of specialized function keys.

It is to be understood that, in other embodiments of the invention, the arc-defining home row keys can be groups of keys other than those listed above for the embodiment shown in FIGS. 7A, 7B and 7C. Further, other embodiments of the invention include home row key sections that have arcs that are elliptical in shape or that approximately represent the natural finger positions as the finger tips rest in the typing position on a hard surface.

In an additional embodiment of the invention, the sections 700a, 700b of home row keys 700 are located such that the 'G' and 'H' keys approximately contact each other, "approximate contact" being defined as described above.

In FIG. 7B, lines 705a and 705b define the V-shape of the home row keys 700. The lines 705a and 705b are perpendicular to the sides of home row keys 700 that are substantially parallel to the line of the hands, wrists and arms when the hands are held over the home row keys 700 ready to type. The lines 705a and 705b also intersect the center points of the 'G' and 'H' keys. It is to be understood that any other pair of lines that form a V-shape such that one of the lines is parallel to one of lines 705a and 705b, and the other of the lines is parallel to the other of lines 705a and 705b, can define the V-shape of home row keys 700.

Table 2 gives the approximate distance (in inches) of the center point of each of the home row keys 700 relative to line 705a or 705b, as appropriate, in a direction perpendicular to and beneath (in FIG. 7B) line 705a or 705b.

TABLE 2

| Key | Distance from line 705a | Distance from line 705b |
| --- | --- | --- |
| A | 0.60 | |
| S | 0.19 | |
| D | 0.07 | |
| F | 0.19 | |
| G | 0 | |
| H | | 0 |
| J | | 0.19 |
| K | | 0.07 |
| L | | 0.19 |
| ; | | 0.60 |
| ' | | 0.48 |

In one embodiment of the invention, a keyboard has home row keys formed in an arced V-shape such that the distance of the center point of each of the home row keys from a line (defined as line 705a and 705b, as appropriate), in a direction perpendicular to the line, is approximately the same as the distances given in Table 2. In another embodiment of the invention, a keyboard has home row keys located such that the distance of the center point of each of the home row keys from the above-defined line, in a direction perpendicular to the line, is between 0.1 inches (2.54 mm) greater than and 0.1 inches less than the distances given in Table 2.

Figure 8:
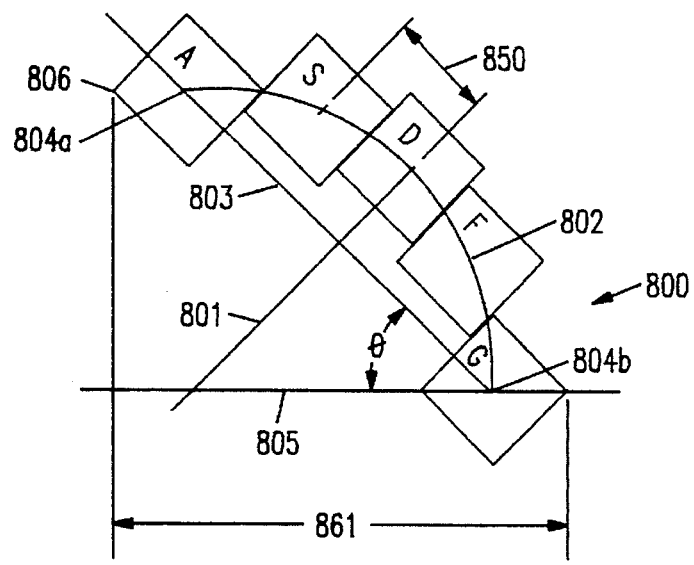
FIG. 8 shows the left section of a set of circular-arc, V-shape home row keys.

FIG. 8 shows a section 800 of a set of arced V-shape home row keys having a circular arc. For section 800, the arc-defining keys are all of the keys in section 800. Radius of curvature 801 of arc 802 can take on a number of different values. Preferably, radius of curvature 801 ranges from infinite (a straight line) to twice interkey spacing 850 of the arc-defining home row keys (a semicircular arc). In one embodiment according to this invention, the radius of curvature of the arc 802 is 1.5 inches.

The angular orientation, i.e., angle Θ, of section 800 can also take on any of a number of values. As shown above, for home row keys 500 arranged in a straight line, effective total width 561 of a set of V-shaped home row keys 500 is reduced when angle Θ is greater than 20.6°. The same holds true for a set of V-shaped home row keys in which the keys in each section, e.g., section 800, are arranged in a circular arc.

As shown in FIG. 8, angle Θ is measured from a line 805 that is substantially parallel to edge 722 of keyboard 740 (FIG. 7C) to a chord 803 extending between center points 804a, 804b of the two outer arc-defining home row keys (i.e., keys 'A' and 'G') of section 800 of home row keys. For any given angle Θ, outer tip 806 of key 'A' is in the same spot that it would be in if the section 800 keys were placed in a straight line rather than arced (i.e., the chord 803 represents the line that would intersect the center points of the section 800 keys if they were placed in a straight line). Thus, effective total width 861 is reduced for angle Θ greater than 20.6° whether section 800 keys are formed in a straight line or a circular arc.

As explained above, a practical upper limit on the value of angle Θ exists. This limit is even lower than that for the embodiment of the invention in which home row keys 500 are formed in a straight line, because the arc of the home row keys 700 results in interference between sections 700a, 700b of home row keys 700 sooner than is the case for sections 500a, 500b of home row keys 500. Preferably, for the embodiment of the invention in which home row keys 700 are arced, the value of angle Θ is less than 75°. Thus, in this embodiment, the value of Θ is preferably between 20.6° and 75°. Within this range, angle Θ is most preferably chosen to be approximately 37.5°. With a value of angle Θ of 37.5°, effective total width 861 of section 800 keys is 3.43 inches (8.72 cm), i.e., 8.5% less than the 3.75 inch (9.53 cm) total width that would result if the keys were not formed at an angle, i.e., angle Θ of 0°.

Figure 9:
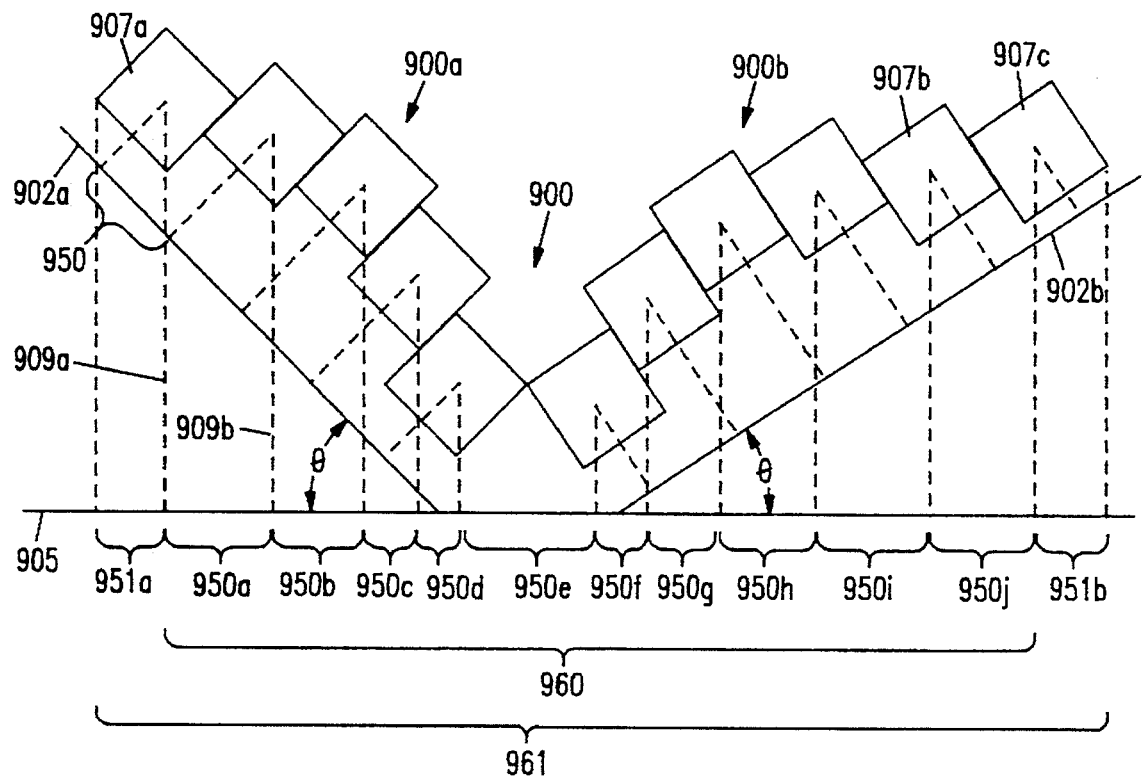
FIG. 9 shows a set of home row keys formed in an arced V-shape.

More generally, as shown in FIG. 9, effective total width 961 of a set of home row keys 900 configured in an arced V-shape is reduced for a sufficiently large angle Θ irrespective of the nature of the arc, e.g. circular, elliptical or some other type. Home row keys 900 are again formed in two sections 900a, 900b. Each of sections 900a, 900b is formed in an arc (not necessarily circular) with respective chords 902a, 902b. Each chord 902a, 902b is oriented at an angle Θ to a line 905 that is substantially parallel to the edge 722 of keyboard 740. Measured along a chord, e.g., chord 902a, interkey spacing 950 between the center points of adjacent keys is 0.75 inches (1.91 cm), i.e., the interkey spacing typically used on a full-size keyboard, as noted above.

Assuming an interkey spacing 950 of 0.75 inches (1.91 cm) between keys 'G' and 'H' (as explained above), the total interkey spacing for home row keys 900 is 7.5 inches (19.1 cm). Since the hands are oriented in a V-shape, with each hand approximately perpendicular to the respective chord 902a or 902b, the fingers receive the full benefit of this interkey spacing 950, i.e., the fingers are no more crowded than they would be on a full-size keyboard.

Figure 2:
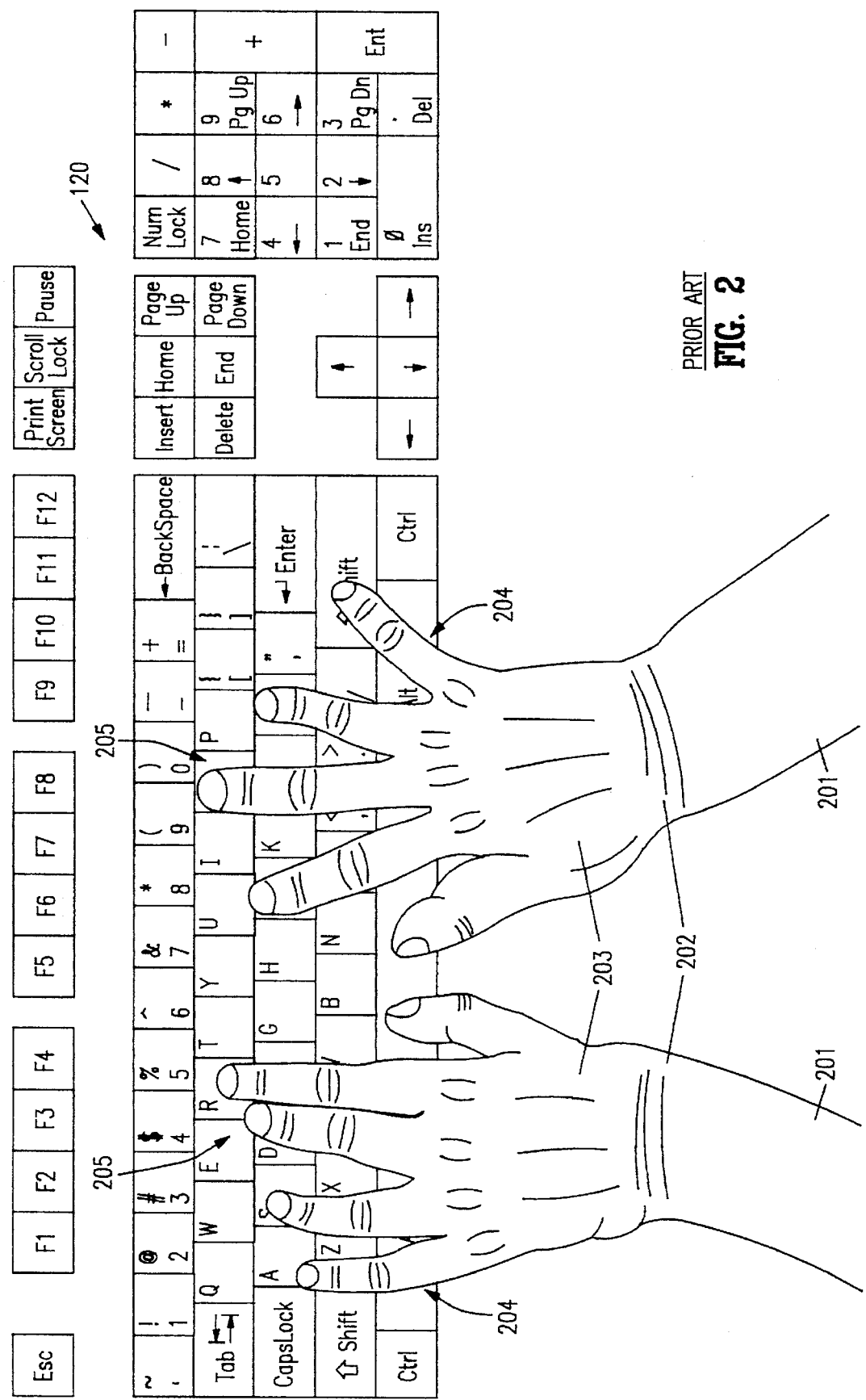
FIG. 2 shows the keyboard of FIG. 1C with hands and forearms placed over the keyboard poised to type.
Figure 3:
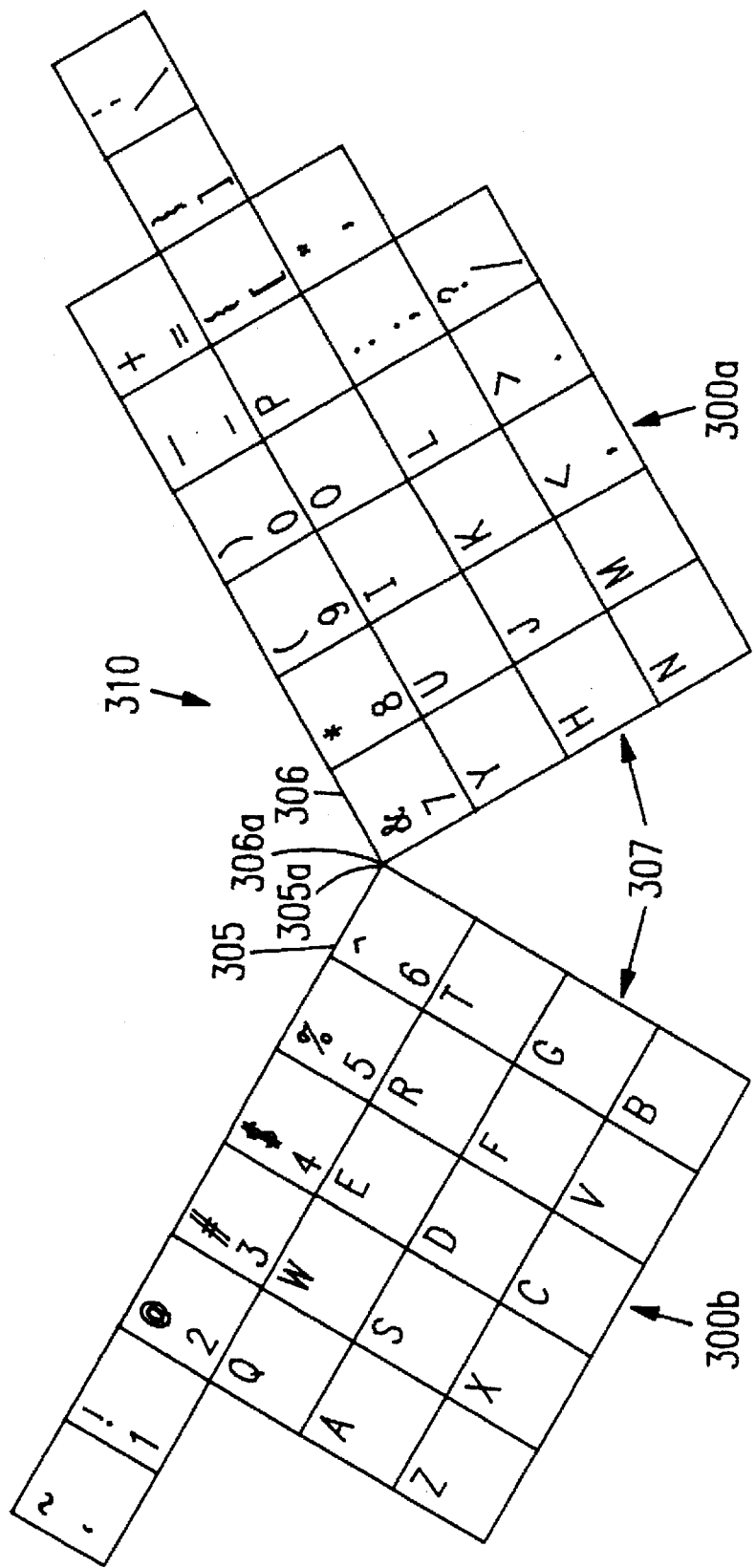
FIG. 3 shows a prior art keyboard.

Though the fingers "feel" a full-size keyboard, the effective total width 961 of home row keys 900 is reduced. Effective interkey spacing 950a, between each of the keys is determined by projecting perpendicular lines, e.g., line 909a, down to the line 905, and measuring the distance, e.g., distance 950a between a pair of adjacent perpendicular lines, e.g., line 909a and line 909b. Total effective interkey spacing 960 of home row keys 900 is the sum of the individual effective interkey spacings 950a, . . ., 950j. Total effective interkey spacing 960 plus distances 951a, 951b equals effective total width 961 of home row 900. For appropriate choices of angle Θ and the arc of each section 900a, 900b of home row keys 900, effective total width 961 of home row keys 900 is reduced in comparison to the effective total width of home row keys 100 (FIG. 2).

Keys 907a, 907b, 907c are actuated by the little finger of the hand. The size of keys 907a, 907b, 907c and interkey spacings 950a, 950i, 950j between keys 907a, 907b, 907c and adjacent keys may be made smaller than the corresponding values for the rest of the home row keys 900 while still retaining sufficient space to allow comfortable and fast typing. In embodiments of the invention in which interkey spacings 950a, 950i, 950j are reduced, interkey spacings 950a, 950i, 950j are referred to as secondary interkey spacings and the other interkey spacings, e.g., interkey spacings 950b, are referred to as primary interkey spacings. Preferably, keys 907a, 907b, 907c are made so that the secondary interkey spacings 950a and 950i are reduced, for example, to 0.625 inches (1.59 cm) and the interkey spacing 950j is reduced to 0.44 inches (1.12 cm). For this embodiment of the invention, total interkey spacing is 6.94 inches (17.5 cm) which is 7.5% less than the full-size value of 7.5 inches (19.1 cm).

Figure 1A:
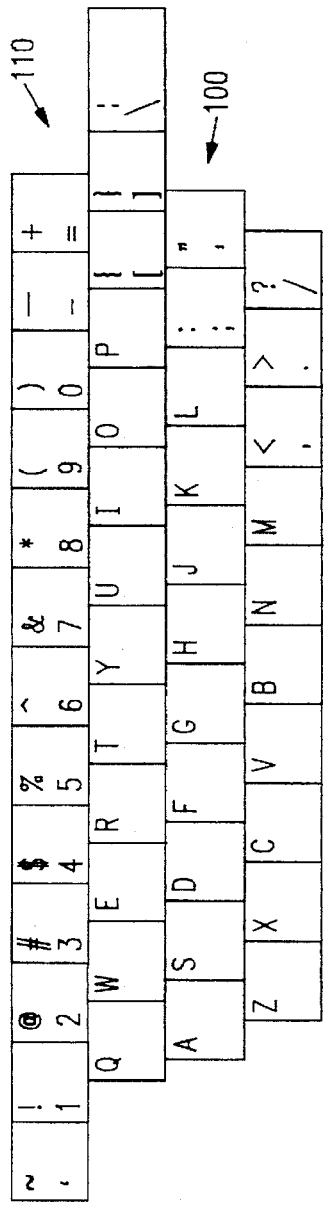
FIG. 1A shows the standard QWERTY keyboard layout.
Figure 1B:
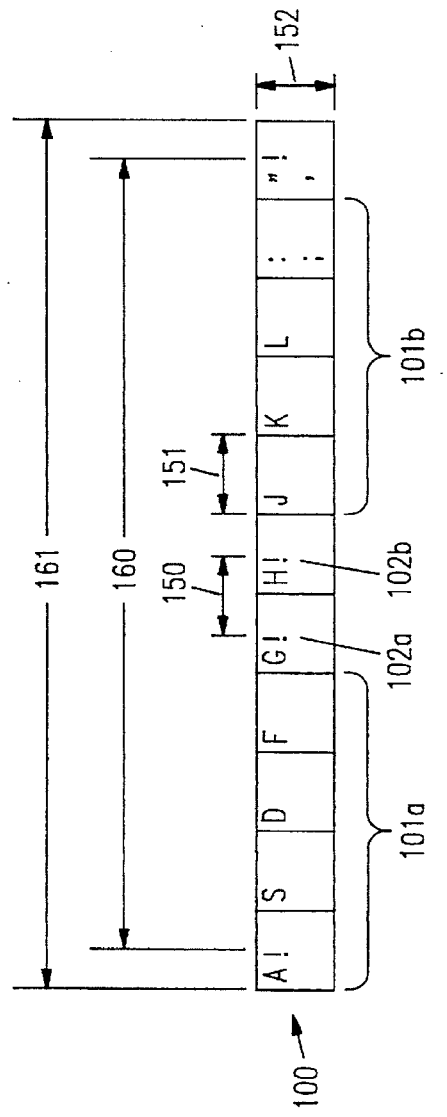
FIG. 1B shows the home row keys for the standard QWERTY keyboard layout.
Figure 1C:
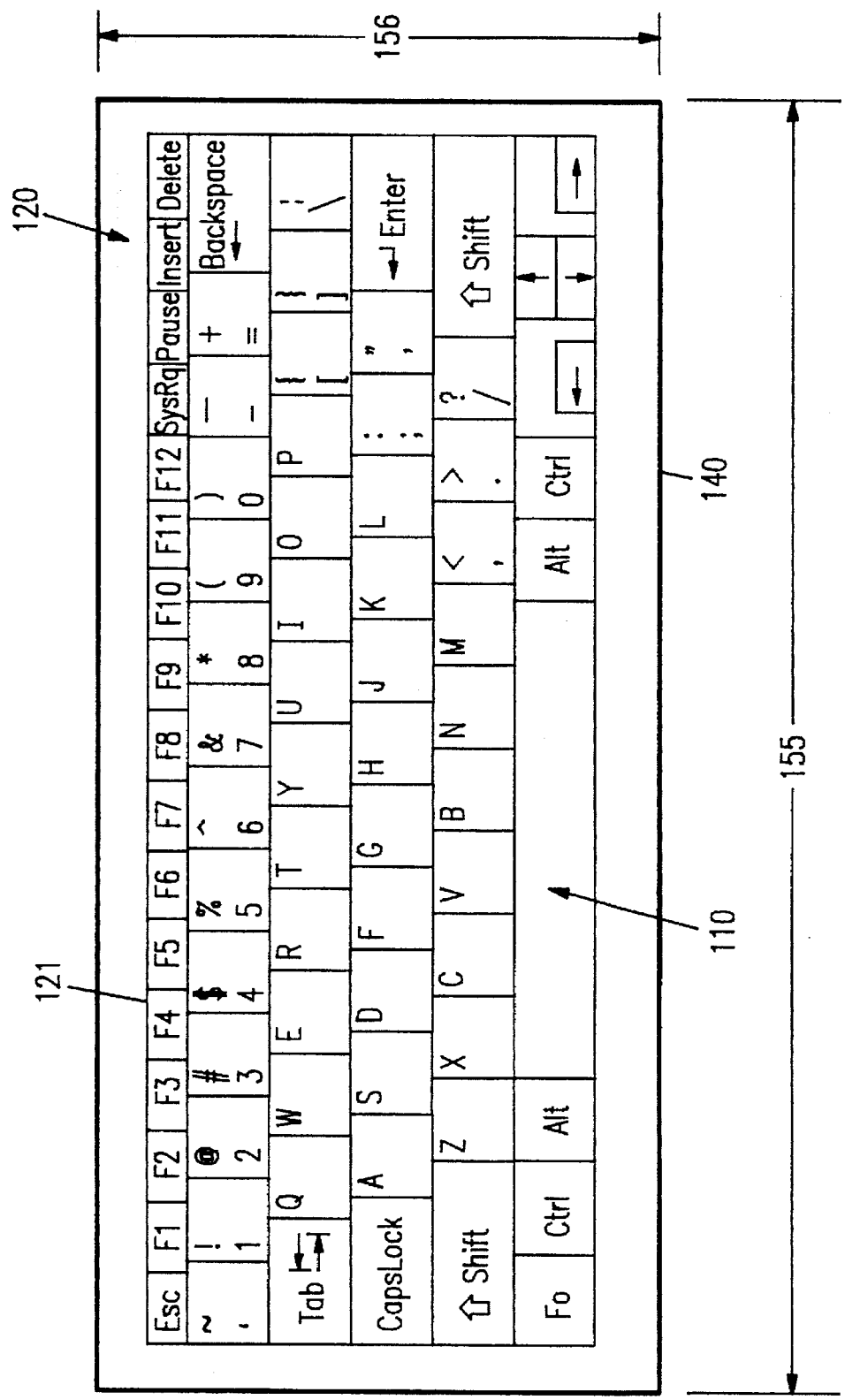
FIG. 1C shows a keyboard with an extended keyboard layout including the standard QWERTY keyboard layout and a variety of specialized function keys.

Once the locations of a set of home row keys are determined, the rest of the keyboard is laid out. FIG. 7B shows a QWERTY keyboard layout 710 formed in an arced V-shape with home row keys 700 arranged as in FIG. 7A. In this embodiment of the invention, the rows of keys 701, 702 immediately above and below home row keys 700 are located so that the same relative finger movements are required to actuate the keys in the rows 701 and 702 as are required for the standard QWERTY keyboard layout 110 of FIG. 1B.

Row of keys 703 is laid out so that, accounting for the rotated position of the hands, the position of the keys 703 relative to the home row keys 700 is as near as possible to the position that would occur in a standard QWERTY keyboard layout 110. However, these relative key positions are changed as necessary to minimize the total width of the row of keys 703. Since the row of keys 703 is used significantly less than the other rows of keys 700, 701, 702, these changes from the standard relative positions do not significantly adversely affect the ease of transition from a standard QWERTY keyboard layout 110 to QWERTY keyboard layout 710 according to this embodiment of the invention.

As for home row keys 700, each of the additional keys that is actuated by the little finger of the hand is preferably made so that the interkey spacing between those keys and adjacent keys in the same row is smaller than the interkey spacing between other pairs of adjacent keys in the same row. In FIG. 7B, the interkey spacing between the 'A' key and 'S' key is 0.61 inches, the interkey spacing between the 'L' key and ';' key is 0.61 inches, and the interkey spacing between the ';' key and '"' key is 0.47 inches.

FIG. 7C shows an extended keyboard 720 according to an embodiment of the invention including the QWERTY keyboard layout 710 of FIG. 7A with additional function keys, e.g., 721 added. The function keys, e.g., 721 include, for instance, 'Caps Lock', 'Ctrl', 'Shift', 'Tab', 'Alt', 'Enter', 'Back Space', and numerical function keys.

Table 3 gives the approximate location of the center point of each key relative to corner 770 of keyboard 740. Table 3 shows how many inches in each of directions 775 and 776 each key center point lies from corner 770.

TABLE 3

| Key | Direction 875 (inches) | Direction 876 (inches) |
|---|---|---|
| A | 1.13 | 1.97 |
| B | 3.57 | 3.74 |
| C | 2.51 | 3.21 |
| D | 2.53 | 2.35 |
| E | 2.68 | 1.61 |
| F | 3.07 | 2.89 |
| G | 3.81 | 3.24 |
| H | 4.58 | 3.24 |
| I | 5.36 | 1.86 |
| J | 5.31 | 2.90 |
| K | 5.82 | 2.38 |
| L | 6.47 | 2.04 |
| M | 5.88 | 3.32 |
| N | 5.08 | 3.67 |
| O | 6.10 | 1.46 |
| P | 6.85 | 1.40 |
| Q | 1.22 | 1.32 |
| R | 3.25 | 2.04 |
| S | 1.86 | 2.04 |
| T | 3.71 | 2.40 |
| U | 4.89 | 2.28 |
| V | 2.94 | 3.69 |
| W | 2.04 | 1.32 |
| X | 1.92 | 2.75 |
| Y | 4.38 | 2.53 |
| Z | 1.28 | 2.64 |
| ;: | 7.22 | 1.94 |
| '" | 7.65 | 1.49 |
| ,< | 6.36 | 3.04 |
| .> | 7.01 | 2.75 |
| /? | 7.61 | 2.49 |
| \| | 8.17 | 0.49 |
| -_ | 6.43 | 0.94 |
| =+ | 6.90 | 0.79 |
| [{ | 7.39 | 1.11 |
| ]} | 7.79 | 0.81 |
| `~ | 1.00 | 0.78 |
| TAB | 0.44 | 0.96 |
| CAPS LOCK/CONTROL | 0.44 | 1.58 |
| SHIFT (R) | 8.13 | 2.08 |
| SHIFT (L) | 0.42 | 2.22 |
| DELETE | 7.53 | 0.40 |
| ENTER | 8.11 | 1.17 |
| SPACE | 4.19 | 4.24 |
| 1! | 1.51 | 0.79 |
| 2@ | 2.07 | 0.75 |
| 3# | 2.60 | 0.94 |
| 4$ | 3.06 | 1.18 |
| 5% | 3.51 | 1.63 |
| 6^ | 3.93 | 1.90 |
| 7& | 4.51 | 1.93 |
| 8* | 4.86 | 1.58 |
| 9( | 5.42 | 1.21 |
| 0) | 5.89 | 0.97 |

Keyboard width 755 is 8.5 inches (21.6 cm), which is 22.7% smaller than the typical full-size keyboard (assuming a full-size keyboard width of 11 inches (29.2 cm)), 12.8% smaller than the Gateway 2000 Handbook width of 9.75 inches (24.8 cm), and approximately equal to the width of the keyboard made by Poqet Computer. The total interkey spacing of 7.125 inches (18.10 cm) along the home row 700 is only 5% less than the 7.5 inch (19.1 cm) total interkey spacing of the full-size keyboard, is 2% greater than the 7.0 inch (17.8 cm) interkey spacing of the Gateway 2000 Handbook keyboard, and is 18.75% greater than the 6 inch (15.2 cm) total interkey spacing of the Poqet Computer keyboard.

The embodiment of the invention shown in FIG. 7C is merely representative of a possible specific keyboard arrangement. The primary thrust of the invention is in the arrangement of home row keys 700 and other QWERTY rows 701, 702, 703. The invention contemplates arrangements of the function keys, e.g., 721 other than the arrangement shown in FIG. 7C. For example, in a number of keyboards, the locations of the 'Caps Lock' and 'Ctrl' keys are switched from the layout shown in FIG. 7C. Such a switch is within the ambit of the invention.

Figure 10:
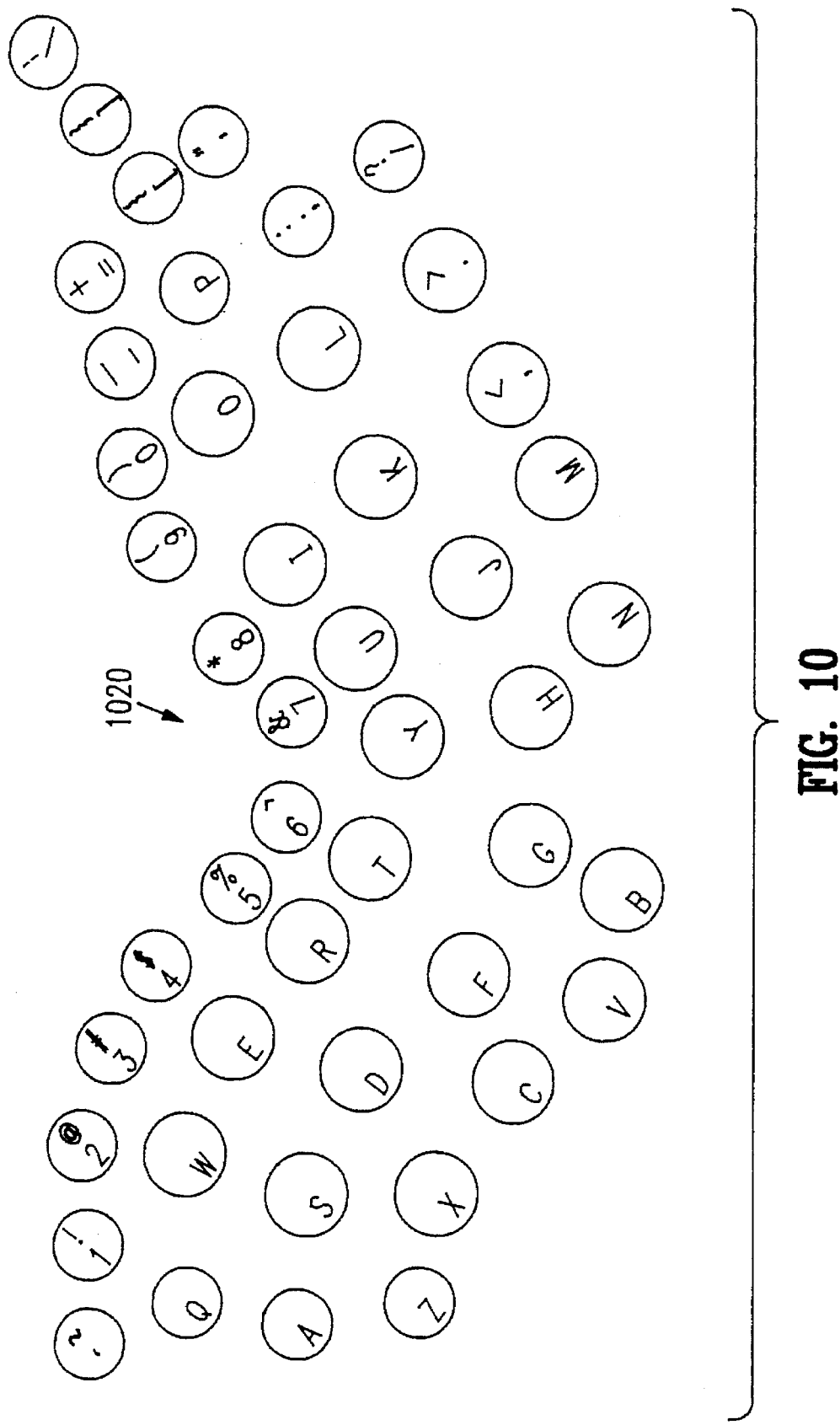
FIG. 10 shows the QWERTY keyboard layout of FIG. 7A with keys having a round finger contacting surface.

The embodiments of the invention described so far have all included keys having finger contacting surfaces with an approximately rectangular shape. The invention is not limited to this or any other key shape. FIG. 10 shows a QWERTY keyboard layout 1020 according to the invention in which the finger contacting surfaces of the keys are circular. Other key shapes could also be used.

Figure 11:
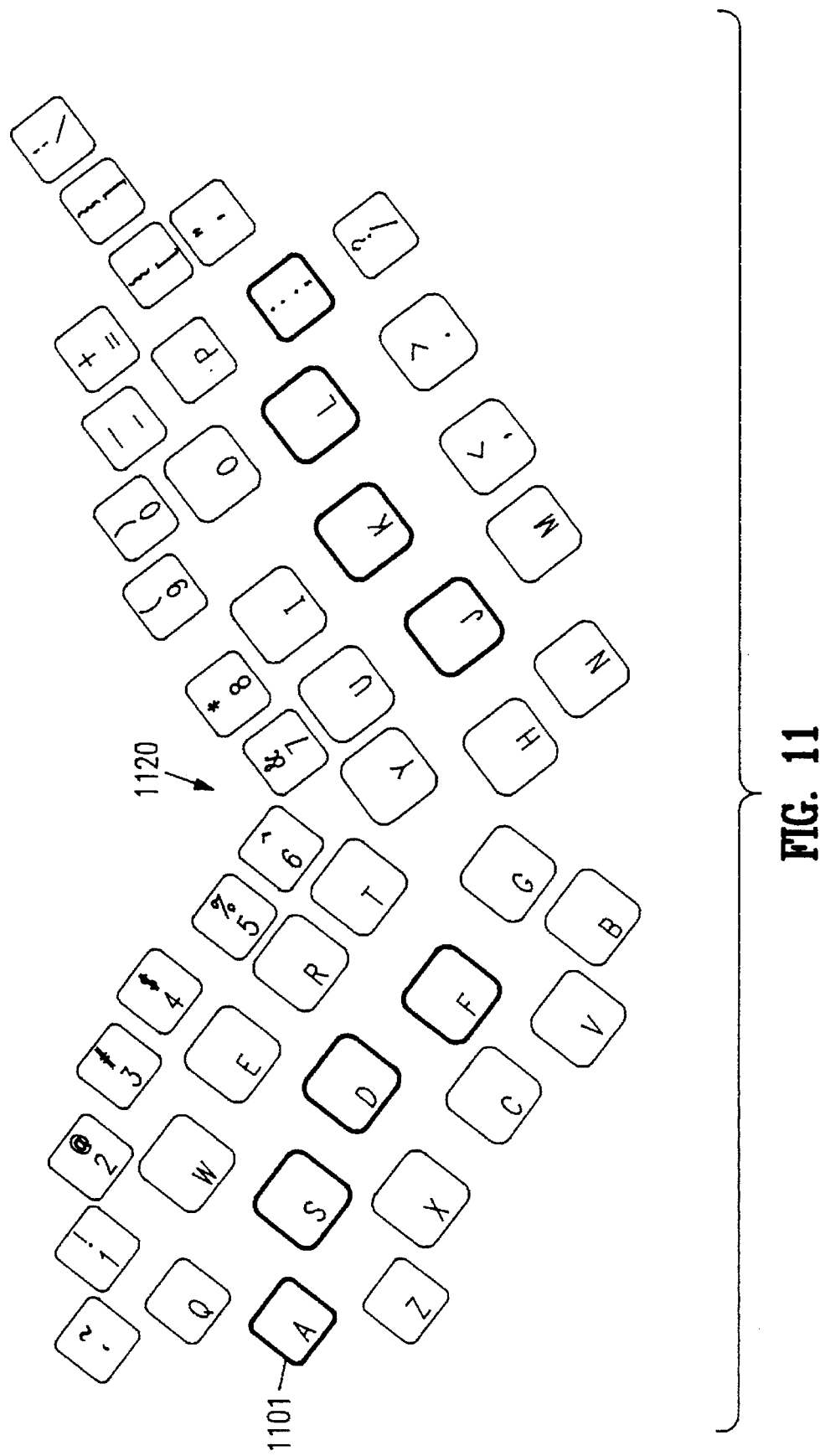
FIG. 11 shows the QWERTY keyboard layout of FIG. 7A with the primary home row keys having finger contacting surfaces accented according to an embodiment of the invention.

Since the hands rest on certain home row keys (i.e., 'A', 'S', 'D', 'F', 'J', 'K', 'L', ';') when poised for typing, it is desirable to highlight the position of these primary home row keys in some fashion so that they may be distinguished at a glance from other keys on the keyboard. FIG. 11 shows a QWERTY keyboard layout 1120 according to an embodiment of the invention in which the finger contacting surface of each of the primary home row keys, e.g., 1101 has a thick line formed around the circumference of the finger contacting surface. The lines may be of any color. Further, different patterns or designs can be formed on the finger contacting surfaces of the primary home row keys, e.g., 1101 according to this embodiment of the invention. In another embodiment according to the invention, only the 'F' and 'J' keys, or only the 'D' and 'K' keys are highlighted, rather than all of the primary home row keys, e.g., 1101.

Figure 12:
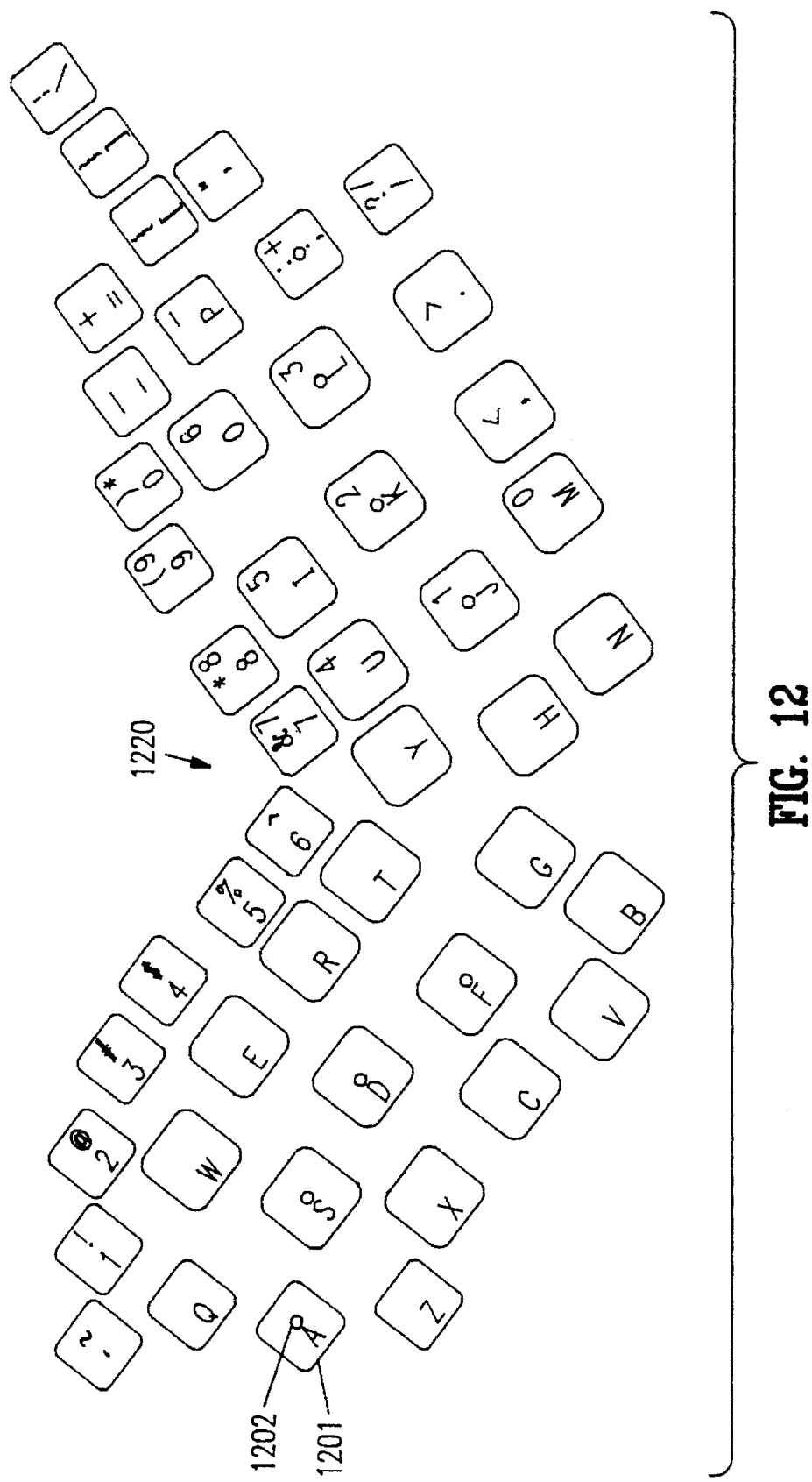
FIG. 12 shows the QWERTY keyboard layout of FIG. 7A with the primary home row keys having protrusions formed on the finger contacting surfaces according to an embodiment of the invention.

FIG. 12 shows a different approach to highlighting the primary home row keys, e.g., key 1201, of QWERTY keyboard layout 1220. In this embodiment of the invention, protrusions, e.g., protrusion 1202, are formed on the finger contacting surface of each of the primary home row keys e.g., key 1201. It is to be understood that the protrusions, e.g., protrusion 1202, may be of any shape and may be located anywhere on the finger contacting surface of the primary home row keys, e.g., key 1201. In another embodiment of the invention, protrusions, e.g., protrusion 1202, are formed only on pairs of keys, e.g., the 'F' and 'J' keys or the 'D' and 'K' keys, rather than on all of the primary home row keys, e.g., key 1201.

Some keyboards are made with a numeric keypad formed separate from the other keys. The separate numeric keypad necessitates that these keyboards be relatively large to accommodate the additional keys. To keep the size of the keyboard small while still providing the benefits of a numeric keypad, the numeric keypad may be embedded within the layout of the other keys on the keyboard. This is most advantageously done by superimposing the numbers 0 through 9 on certain of the keyboard keys.

Figure 13:
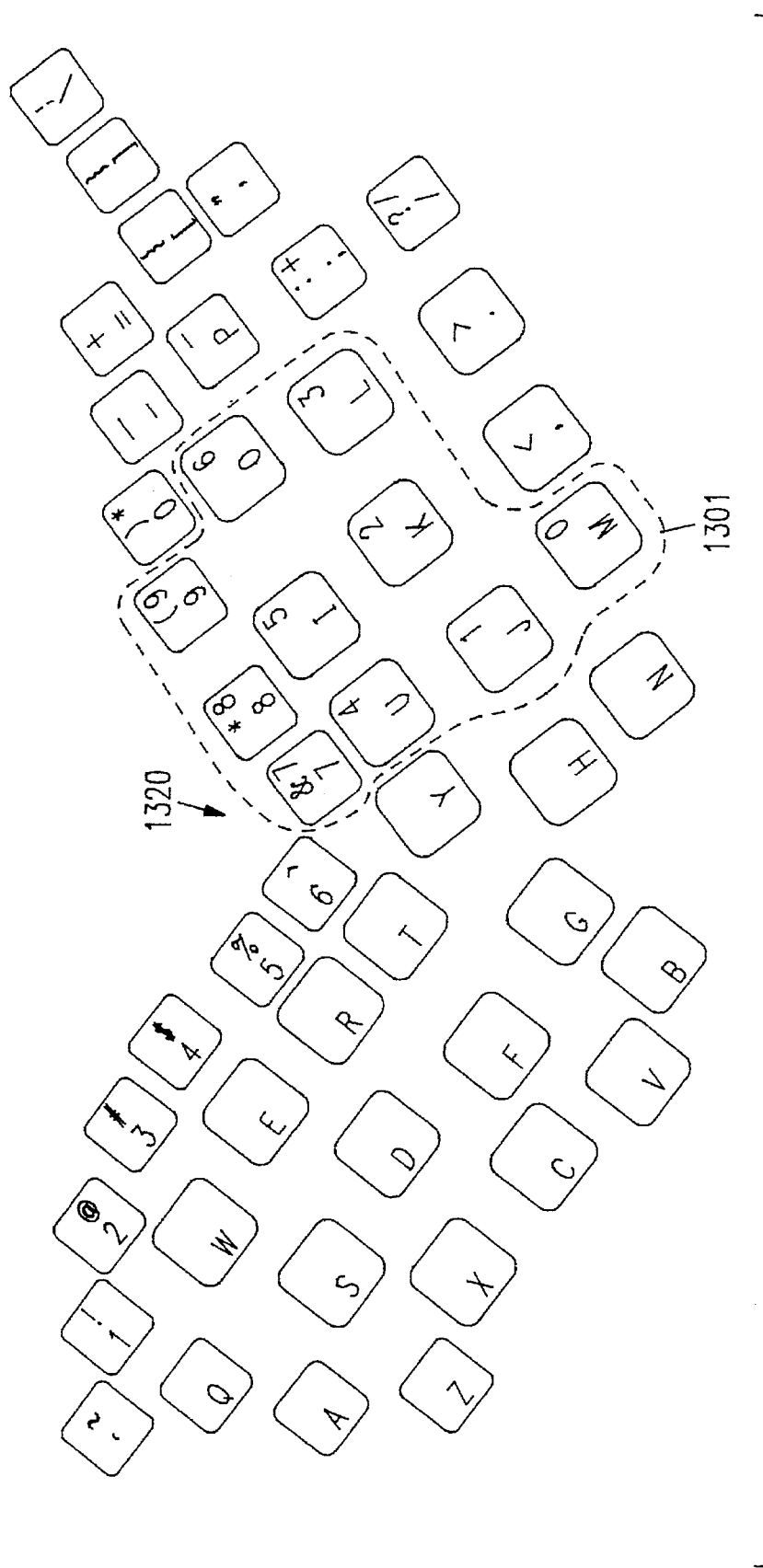
FIG. 13 shows the QWERTY keyboard layout of FIG. 7A with an embedded numeric keypad formed therein according to an embodiment of the invention.

In FIG. 13, a QWERTY keyboard layout 1320 according to an embodiment of the invention is shown in which such a numeric keypad 1301 is superimposed on the '7', '8', '9', 'U', 'I', 'O', 'J', 'K', 'L' and 'M' keys. The numeric keypad 1301 could alternatively be superimposed on other keyboard keys. The numeric keypad 1301 may be actuated by pressing an appropriate key or combination of keys (e.g., the NUM LOCK key).

The extended keyboard layouts described so far have all shown a space bar located on the main keyboard surface adjacent the bottom row of QWERTY keys. Since the keyboard according to the invention is advantageously used as a reduced size keyboard, it may be awkward for the hands to actuate a space bar located conventionally on the main keyboard surface beneath the bottom row of QWERTY keys.

Figure 14:
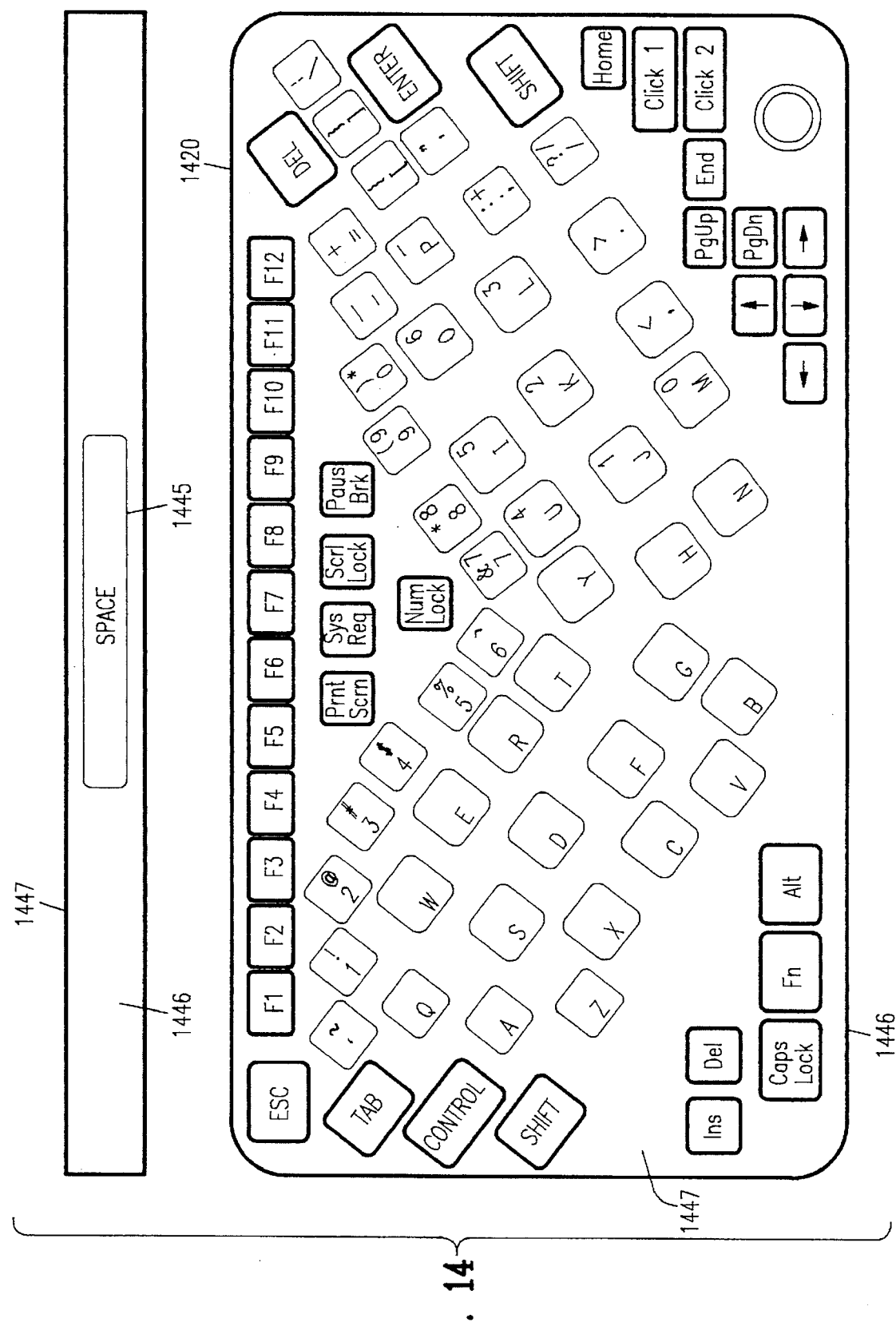
FIG. 14 shows a perspective view of an extended keyboard as in FIG. 7C in which the space bar is formed on the keyboard according to an embodiment of the invention.

FIG. 14 shows a keyboard 1420 according to another embodiment of the invention in which a space bar 1445 is formed on a surface 1446 that is approximately perpendicular to the main keyboard surface 1447 and adjacent the bottom row of QWERTY keys. In a further embodiment, the space bar 1445 is formed both on the main keyboard surface 1447 underneath the bottom row of QWERTY keys and on the surface 1446.

Each of the embodiments of the keyboard according to the invention discussed so far have incorporated keyboard layouts onto a unitary keyboard. As shown in FIGS. 15A, 15B, 15C and 15D, a keyboard 1540 according to the invention could be formed with two keyboard halves 1540a, 1540b. The keyboard 1540 is thus reduced in size when the keyboard 1540 is not in use.

Figure 15A:
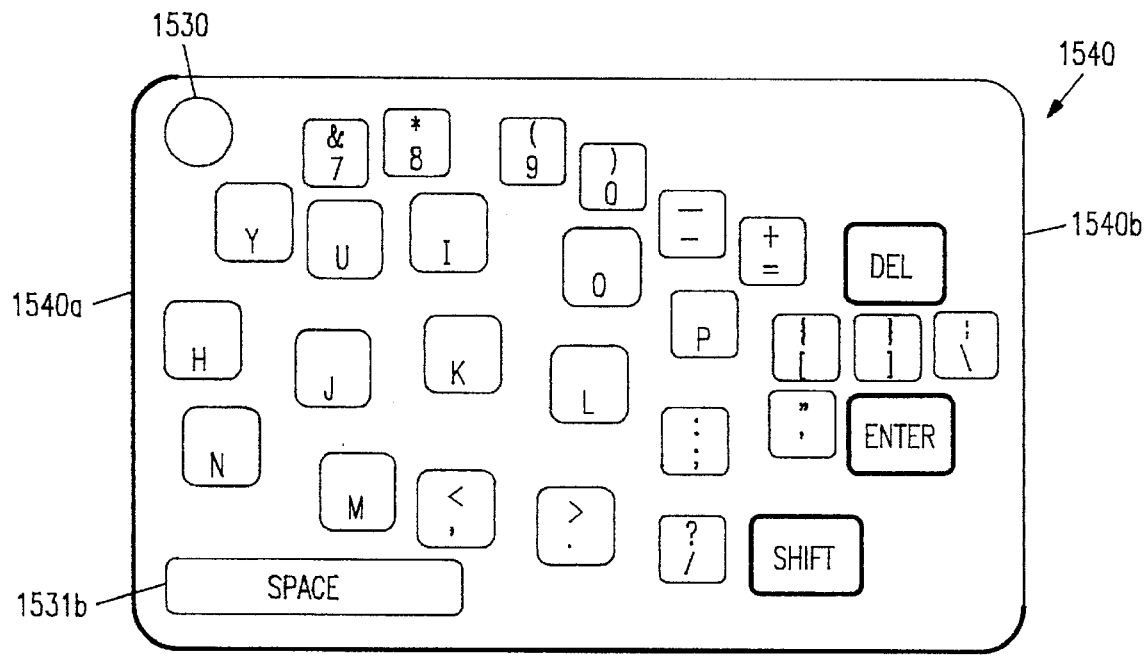
FIG. 15A shows a keyboard according to the invention formed with two physically separate keyboard halves disposed one over the other.
Figure 15B:
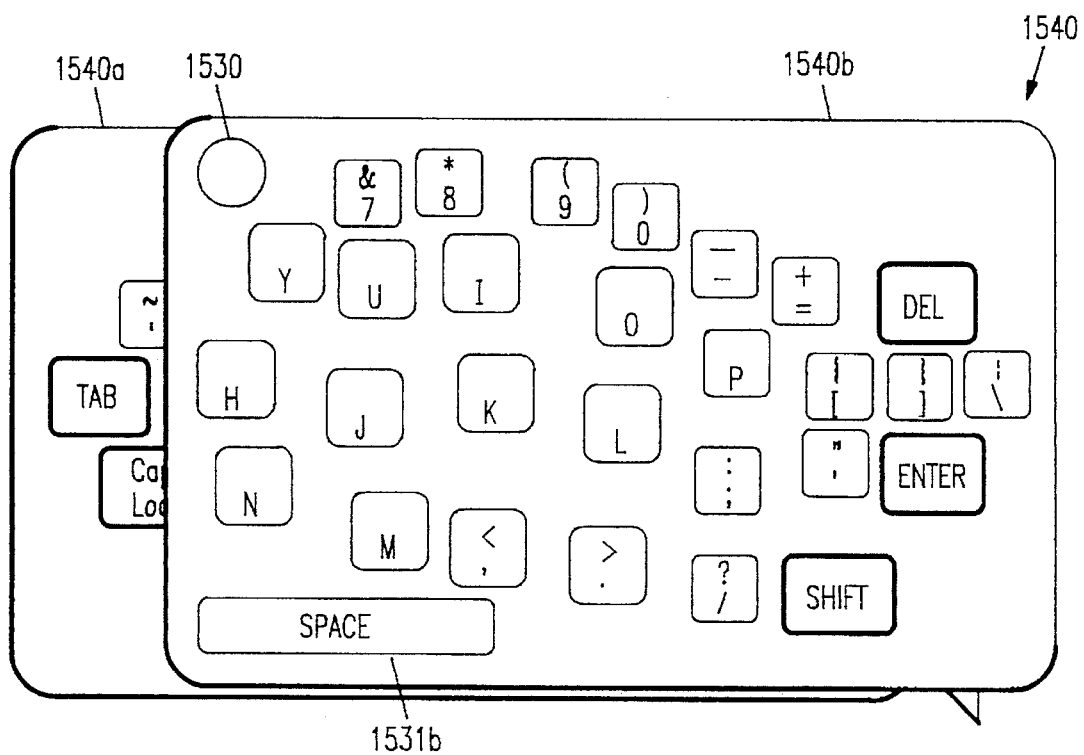
FIG. 15B shows the keyboard of FIG. 15A as the two keyboard halves begin to slide away from each other.
Figure 15C:
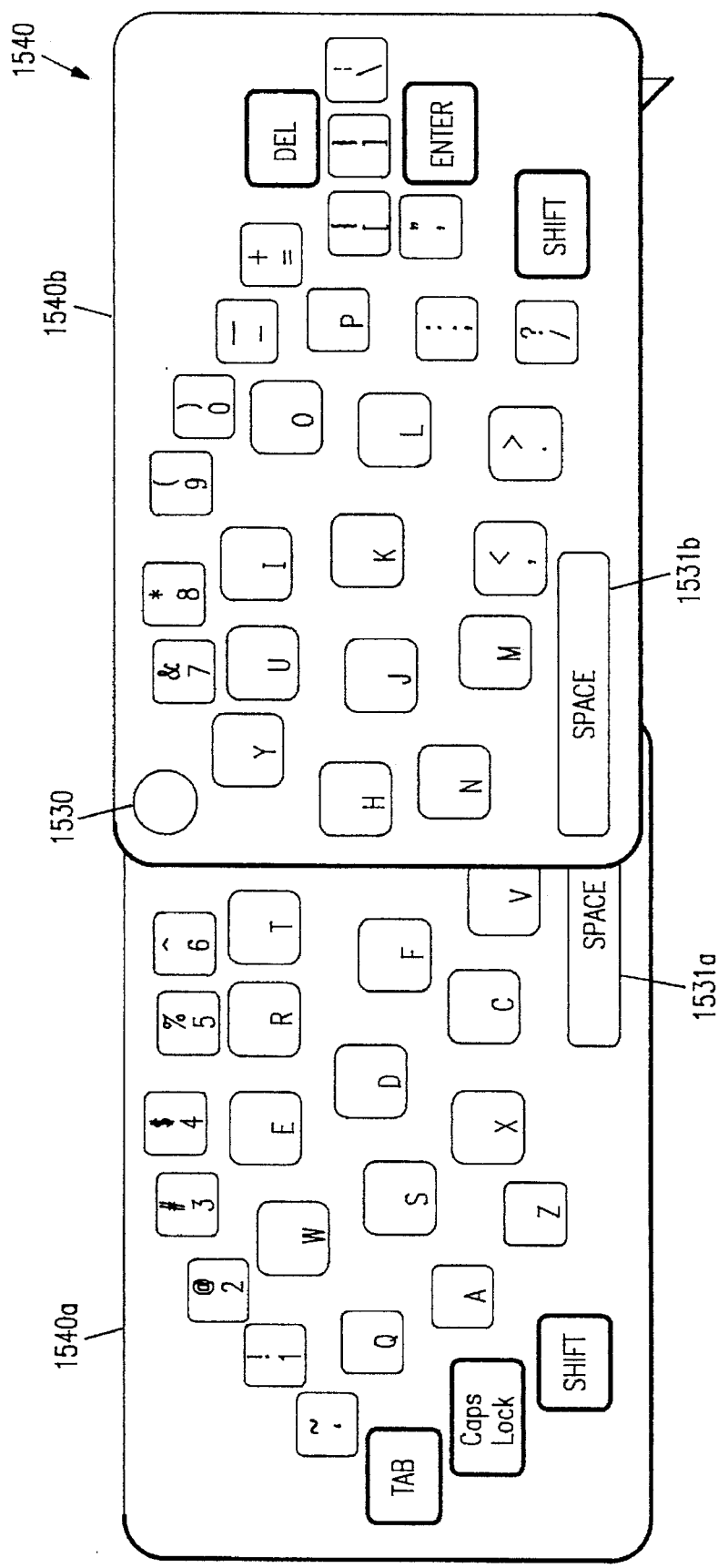
FIG. 15C shows the keyboard of FIG. 15A with the two keyboard halves fully extended.
Figure 15D:
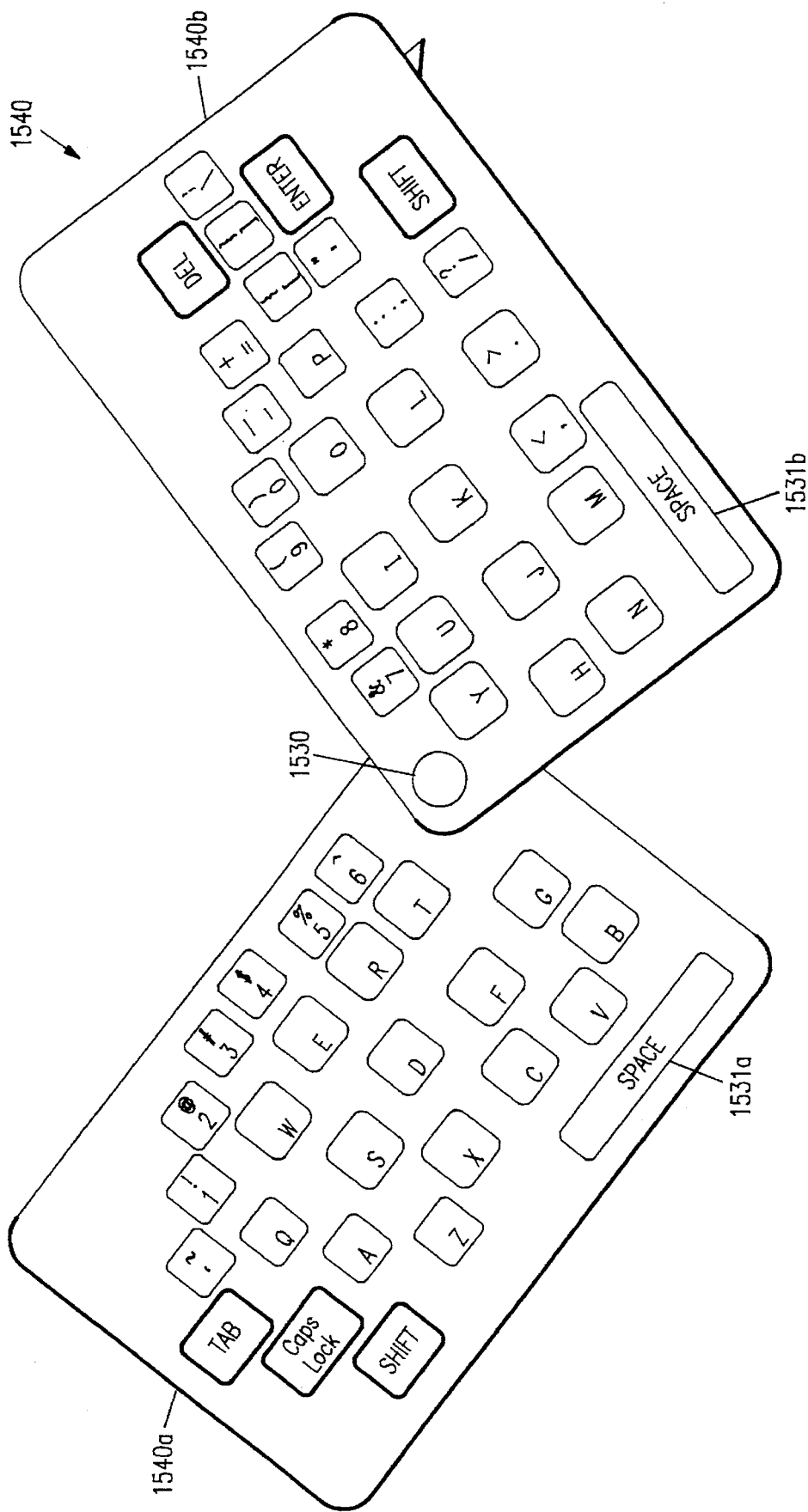
FIG. 15D shows the keyboard of FIG. 15A with the two keyboard halves fully extended and pivoted to form a V-shape.

As shown in FIG. 15A, when the keyboard 1540 is not in use, the keyboard halves 1540a and 1540b are disposed one over the other and held in place by a conventional locking mechanism (not shown). As shown in FIG. 15B, when it is desired to use the keyboard 1540, the locking mechanism is released and the keyboard halves 1540a and 1540b slide away from each other. A fin (not shown) formed on the keyboard half 1540a fits into a slot (not shown) formed in the keyboard half 1540b and maintains the relative position of the two halves 1540a, 1540b as they slide with respect to each other. As shown in FIG. 15C, the keyboard halves 1540a and 1540b slide with respect to each other until the fin formed on keyboard half 1540a slides into the hole 1530. At this point, the keyboard 1540 is fully extended. As shown in FIG. 15D, the keyboard halves 1540a and 1540b are then pivoted with respect to one another such that the fin rotates in the hole 1530 and the keyboard halves 1540a and 1540b form a V-shape with respect to each other. The keyboard halves 1540a and 1540b are formed with a conventional locking mechanism (not shown) such that the keyboard halves 1540a and 1540b may be locked into any one of a number of angular positions with respect to each other. For instance, the hole 1530 could be formed with ridges such that the fin may be ratcheted into one of a plurality of positions.

As shown in FIGS. 15A, 15B, 15C and 15D, the QWERTY keyboard layout is formed in an arced V-shape as in FIGS. 7A and 7C. It is to be understood that the QWERTY keyboard layout according to this embodiment of this invention could likewise be formed without arcs as shown in FIGS. 5A and 5C. Likewise, the particular function key arrangement shown is merely illustrative. Other function key arrangements are within the ambit of this embodiment of the invention. Additionally, though FIGS. 15A, 15B, 15C and 15D show space bars 1531a and 1531b formed on each of the keyboard halves 1540a and 1540b, respectively, it is to be understood that a single space bar could be formed on only one of the keyboard halves 1540a and 1540b.

If the keyboard according to the invention is used with a computer, electronic circuitry is disposed within the keyboard so that when a key is actuated, an appropriate electronic signal is transmitted from the keyboard to the computer. The electronic circuitry may also be configured so that simultaneously actuating particular groups of two or more keys will transmit a different electronic signal to the computer than would actuation of any individual key of the group. Conventional electronic circuitry used for this purpose may be used with the keyboard according to the invention. The keyboard according to the invention does not require any special configuration or type of electronic circuitry to interface with a computer.

Keyboards according to the invention may include any type of key actuation. For instance, individual keys may be actuated by depressing individually formed key contact surfaces that are attached to a plunger. Depressing the key depresses the plunger such that an electrical contact is made and an electrical signal is sent to the computer. Alternatively, the keys may formed integrally with the keyboard such that the keys are substantially level with the remainder of the adjacent keyboard surface, and be touch sensitive (in a manner similar to that found in many bank automatic teller machines) such that no appreciable displacement of the key contact surface occurs upon key actuation.

Various embodiments of the invention have been described. The descriptions are intended to be illustrative, not limitative. Thus, it will be apparent to one skilled in the art that certain modifications may be made to the invention as described without departing from the scope of the claims set out below. For instance, in keyboards according to the invention, the finger contacting surface of the keys may be placed at any height above the remainder of the keyboard key surface. Further, the finger contacting surface of the keys may be flat, concave or convex, as desired. Also, the plane defined by the edges of the finger contacting surface may be tilted in any direction at any angle with respect to the remainder of the keyboard key surface, e.g., each finger contacting surface could be tilted toward the center of the QWERTY keyboard layout.

I claim:

1. A keyboard, comprising:
    a first group of keys located on a main keyboard surface for accepting commands from a user;
        wherein said first group of keys includes keys A, S, D, F, and G arranged in a QWERTY format and said first group of keys have a common shape; and
    a second group of keys located on the main keyboard surface for accepting commands from the user;
        wherein said second group of keys includes keys L, K, J, and H arranged in a QWERTY format;
    the second group is arranged at an angle with respect to the first group so that the first and second groups form a V-shape wherein a vertex of said V-shape is closest to a bottom edge of said main keyboard surface and sides of said V-shape extend from said vertex towards an Upper edge of said main keyboard surface;
    said key G of the first group that is nearest said key H in the second group being the same shape as the key H;
    a plurality of keys in said first group are arranged in a first arc about one side of said V-shape;
    a plurality of keys in said second group are arranged in a second arc about another side of said V-shape and said first and second arcs are the same; and
    said key G of the first group and said key H of the second group are positioned adjacent to said vertex of said V-shape and said key G approximately contacts said key H.

2. A keyboard as in claim 1, wherein a first angle formed between the side of said V-shape defined by the first group of keys and a line substantially parallel to said bottom edge of said main keyboard surface is between 20.6° and 75°.

3. A keyboard as in claim 2, wherein a second angle formed between the side of said V-shape defined by the second group of keys and said line substantially parallel to said bottom edge of said main keyboard surface is between 20.6° and 75°.

4. A keyboard as in claim 2, wherein the first angle is 37.5°.

5. A keyboard as in claim 1, wherein the first and second groups of keys are substantially rectangular.

6. A keyboard as in claim 1, wherein the keys are round.

7. A keyboard as in claim 1, wherein a protusion is formed on a finger contacting surface of each key in said first and second groups of keys.

8. A keyboard as in claim 1, further comprising a space bar, the space bar located on a surface substantially perpendicular to the main keyboard surface.

9. A keyboard as in claim 1 further comprising a space bar located on the main keyboard surface.

10. A keyboard as in claim 1, wherein the main keyboard surface measures no more than 8.5 inches in width; no more than 4.5 inches in height; and has a total interkey spacing of about 7.125 inches.

11. A keyboard as in claim 1 wherein said plurality of keys in said first group is said keys A, S, D, and F wherein said alphanumeric key A defines a first end of said first arc and said alphanumeric key F defines a second end of said arc.

12. A keyboard as in claim 11 wherein said plurality of keys in said second group is said keys J, K, and L wherein said alphanumeric key J defines a first end of said second arc.

13. A keyboard as in claim 12, wherein each of the first and second arcs are circular.

14. A keyboard as in claim 12, wherein each of the first and second arcs are elliptical.

15. A keyboard as in claim 12, wherein each of the first and second arcs are parabolic.

16. A keyboard as in claim 1 wherein said plurality of keys in said first group is said keys A, S, D, F, and G wherein said alphanumeric key A defines a first end of said first arc and said alphanumeric key G defines a second end of said first arc.

17. A keyboard as in claim 16 wherein said plurality of keys in said second group is said keys H, J, K, and L wherein said alphanumeric key H defines a first end of said second arc.

18. A keyboard as in claim 17, wherein each of the first and seconds arcs are circular.

19. A keyboard as in claim 17, wherein each of the first and second arcs are elliptical.

20. A keyboard as in claim 17, wherein each of the first and second arc are parabolic.

21. A keyboard comprising:

a first group of primary home row keys located on a main keyboard surface for accepting commands from a user and including a key G, wherein a set of center points of a plurality of keys in said first group of primary home row keys define a first arc having a first chord; and said first group of primary home row keys have a common shape; and a second group of primary home row keys located on the main keyboard surface for accepting commands from the user and including a key H, wherein a set of center points of a plurality of keys in said second group of primary home row keys define a second arc having a second chord;

wherein said first and second groups of primary home row keys are arranged according to the QWERTY format;

the first and second chords form a V-shape wherein a vertex of said V-shape is closest to a bottom edge of said main keyboard surface and said first and second chords are sides of said V-shape that extend from said vertex towards an upper edge of said main keyboard surface; and said key G of the first group and said key H of the second group are positioned adjacent to said vertex of said V-shape so that said key G approximately contacts said key H.

22. A keyboard as in claim 21, wherein the first and second chords form first and second angles, respectively, with a line substantially parallel to said bottom edge of the main keyboard surface, and each of the angles measuring between 20.6° and 75°.

23. A keyboard as in claim 22, wherein the first and second angles each measure 37.5°.

24. A keyboard as in claim 21 wherein said plurality of keys in said first group is keys A, S, D, and F wherein said key A defines a first end of said first arc and said key F defines a second end of said arc.

25. A keyboard as in claim 24 wherein said plurality of keys in said second group is alphanumeric keys J, K, and L wherein said alphanumeric key J defines a first end of said second arc.

26. A keyboard as in claim 25, wherein each of the first and second arcs are circular arcs.

27. A keyboard as in claim 26, wherein the magnitude of the radius of curvature of each of the first and second arcs is between twice an interkey spacing of adjacent primary home row keys and the radius of curvature of a straight line.

28. A keyboard as in claim 26, wherein each of the first and second arcs has a radius of curvature of 1.5 inches.

29. A keyboard as in claim 25, wherein each of the first and second arcs are elliptical.

30. A keyboard as in claim 25, wherein each of the first and second arcs are parabolic.

31. A keyboard as in claim 21, wherein alphabetical keys other than the primary home row keys are placed relative to the primary home row keys in approximately the same position as found in a standard QWERTY keyboard layout such that, when typing on the keyboard, the same finger motions are maintained as when typing on a standard QWERTY keyboard.

32. A keyboard as in claim 21, wherein the keys are substantially rectangular.

33. A keyboard as in claim 21, wherein the keys are round.

34. A keyboard as in claim 21, wherein a numeric keypad is superimposed on selected ones of the alphanumeric keys.

35. A keyboard as in claim 21, further comprising a space bar, the space bar formed on a surface substantially perpendicular to the main keyboard surface.

36. A keyboard as in claim 21, further comprising a space bar located on the main keyboard surface.

37. A keyboard as in claim 21, wherein the main keyboard surface measures no more than 8.5 inches in width and no more than 4.5 inches in height.

38. A keyboard as in claim 21 wherein said plurality of keys in said first group is alphanumeric keys A, S, D, F, and G wherein said alphanumeric key A defines a first end of said first arc and said alphanumeric key G defines a second end of said arc.

39. A keyboard as in claim 38 wherein said plurality of keys in said second group is alphanumeric keys H, J, K, and L wherein said alphanumeric key H defines a first end of said second arc.

40. A keyboard as in claim 39, wherein each of the first and second arcs are circular.

41. A keyboard as in claim 39, wherein each of the first and second arcs are elliptical.

42. A keyboard as in claim 39, wherein each of the first and second arcs are parabolic.

* * * * *